United States Patent
Ishida et al.

(10) Patent No.: US 7,051,124 B2
(45) Date of Patent: May 23, 2006

(54) DATA TRANSFER CONTROL DEVICE, ELECTRONIC EQUIPMENT, AND DATA TRANSFER CONTROL METHOD

(75) Inventors: Takuya Ishida, Sapporo (JP); Yoshiyuki Kamihara, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 196 days.

(21) Appl. No.: 10/140,834

(22) Filed: May 9, 2002

(65) Prior Publication Data

US 2002/0167851 A1 Nov. 14, 2002

(30) Foreign Application Priority Data

May 14, 2001 (JP) .................................. 2001-143429

(51) Int. Cl.
*G06F 13/00* (2006.01)
*G06F 13/14* (2006.01)

(52) U.S. Cl. .............. 710/29; 710/33; 710/52; 711/100; 711/169; 711/170; 711/173

(58) Field of Classification Search ............... 710/29, 710/33, 52; 711/100, 169, 170, 173
See application file for complete search history.

(56) References Cited

U.S. PATENT DOCUMENTS

| | | | | |
|---|---|---|---|---|
| 5,129,072 A | * | 7/1992 | Larner et al. | 710/48 |
| 5,504,868 A | * | 4/1996 | Krakirian | 710/5 |
| 5,568,443 A | * | 10/1996 | Dixon et al. | 365/230.05 |
| 5,708,668 A | * | 1/1998 | Styczinski | 714/6 |
| 5,732,223 A | * | 3/1998 | Moore et al. | 710/52 |
| 6,065,087 A | * | 5/2000 | Keaveny et al. | 710/315 |
| 6,145,045 A | | 11/2000 | Falik et al. | |

(Continued)

FOREIGN PATENT DOCUMENTS

| | | |
|---|---|---|
| DE | 199 00 331 A1 | 7/1999 |
| DE | 199 00 345 A1 | 7/1999 |
| EP | 0 893 755 A2 | 1/1999 |
| JP | 11-4279 | 6/1999 |
| JP | A-11-4279 | 6/1999 |
| JP | A 2001-036588 | 2/2001 |

OTHER PUBLICATIONS

U.S. Appl. No. 10/133,751, Yoshiyaki et al., filed Apr. 29, 2002.
U.S. Appl. No. 10/140,829, Ishida et al., filed May 9, 2002.
Universal Serial Bus Mass Storage Class–Bulk Only Transport Rev. 1.0, Sep. 31, 1999.
Universal Serial Bus Mass Storage Class Specification Overview Rev. 1.1, Jun. 28, 2000.
Anonymous, SCSI Mechanic, SCSI Commands and Status, Jan. 15, 2000, Web search: "SCSI specification" Website: http://www.scsimechanic.com/scsi/SCSI2-07.html.*
The Universal Serial Bus Specification, Revision 1.1, Chapter 8, pp. 155–175, Sep. 23, 1998.

* cited by examiner

*Primary Examiner*—James K. Trujillo
(74) *Attorney, Agent, or Firm*—Oliff & Berridge, PLC

(57) ABSTRACT

A buffer is provided with a CBW area (a randomly accessible command storage area) and an EP1 area (data storage area set to FIFO), when a CBW and data are allocated as informations to be transferred through one end point EP1. When a phase switches from a USB command phase (command transport) to a data phase (data transport), the information write area is switched from the CBW area to the EP1 area and OUT data transferred from the host to the end point EP1 is written into the EP1 area. The area switches from the CBW area to the EP1 area on condition that an acknowledgment has returned to the host in the command phase. In case of a toggle missing, area switching does not occur even if ACK is returned.

19 Claims, 21 Drawing Sheets

U.S. PATENT DOCUMENTS

| | | |
|---|---|---|
| 6,157,975 A | 12/2000 | Brief et al. |
| 6,185,641 B1 | 2/2001 | Dunnihoo |
| 6,244,762 B1 * | 6/2001 | Fukano et al. ................ 400/70 |
| 6,385,691 B1 * | 5/2002 | Mullarkey et al. .......... 711/105 |
| 6,421,770 B1 | 7/2002 | Huch et al. |
| 6,463,498 B1 * | 10/2002 | Wakeley et al. ............ 710/309 |
| 6,715,055 B1 * | 3/2004 | Hughes ...................... 711/170 |
| 6,775,702 B1 * | 8/2004 | Oeda et al. ................. 709/226 |
| 6,834,319 B1 * | 12/2004 | Berndt ....................... 710/307 |

* cited by examiner

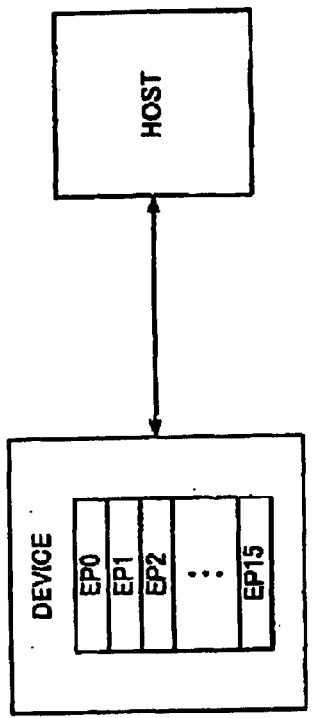
FIG. 1A
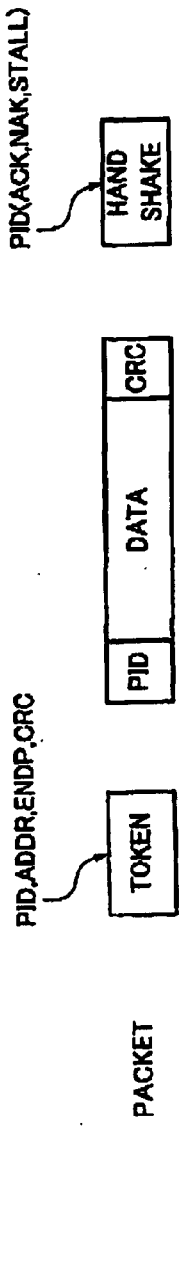
FIG. 1B  PACKET
FIG. 1C  OUT TRANSACTION
FIG. 1D  IN TRANSACTION

FIG. 2A  CBI

| | |
|---|---|
| EP0 (CONTROL) | CONTROL, COMMAND |
| EP1 (BULK-OUT) | OUT DATA |
| EP2 (BULK-IN) | IN DATA |
| EP3 (INTERRUPT) | INTERRUPT IN |

FIG. 2B  Bulk-Only

| | |
|---|---|
| EP0 (CONTROL) | CONTROL |
| EP1 (BULK-OUT) | A1  A2<br>COMMAND (CBW), OUT DATA |
| EP2 (BULK-IN) | A3  A4<br>STATUS (CSW), IN DATA |

FIG. 3

| BIT<br>BYTE | 7 | 6 | 5 | 4 | 3 | 2 | 1 | 0 |
|---|---|---|---|---|---|---|---|---|
| 0~3 | dCBWSignature ||||||||
| 4~7 | dCBWTag ||||||||
| 8~11 | dCBWDataTransferLength ||||||||
| 12 | bmCBWFlags ||||||||
| 13 | RESERVED(0) |||| bCBWLUN ||||
| 14 | RESERVED(0) |||| bCBWCBLength ||||
| 15~30 | CBWCB ||||||||

CBW

FIG. 4

| BIT / BYTE | 7 | 6 | 5 | 4 | 3 | 2 | 1 | 0 |
|---|---|---|---|---|---|---|---|---|
| 0~3 | \multicolumn{8}{c|}{dCSWSignature} |
| 4~7 | \multicolumn{8}{c|}{dCSWTag} |
| 8~11 | \multicolumn{8}{c|}{dCSWDataResidue} |
| 12 | \multicolumn{8}{c|}{bCSWStatus} |

CSW

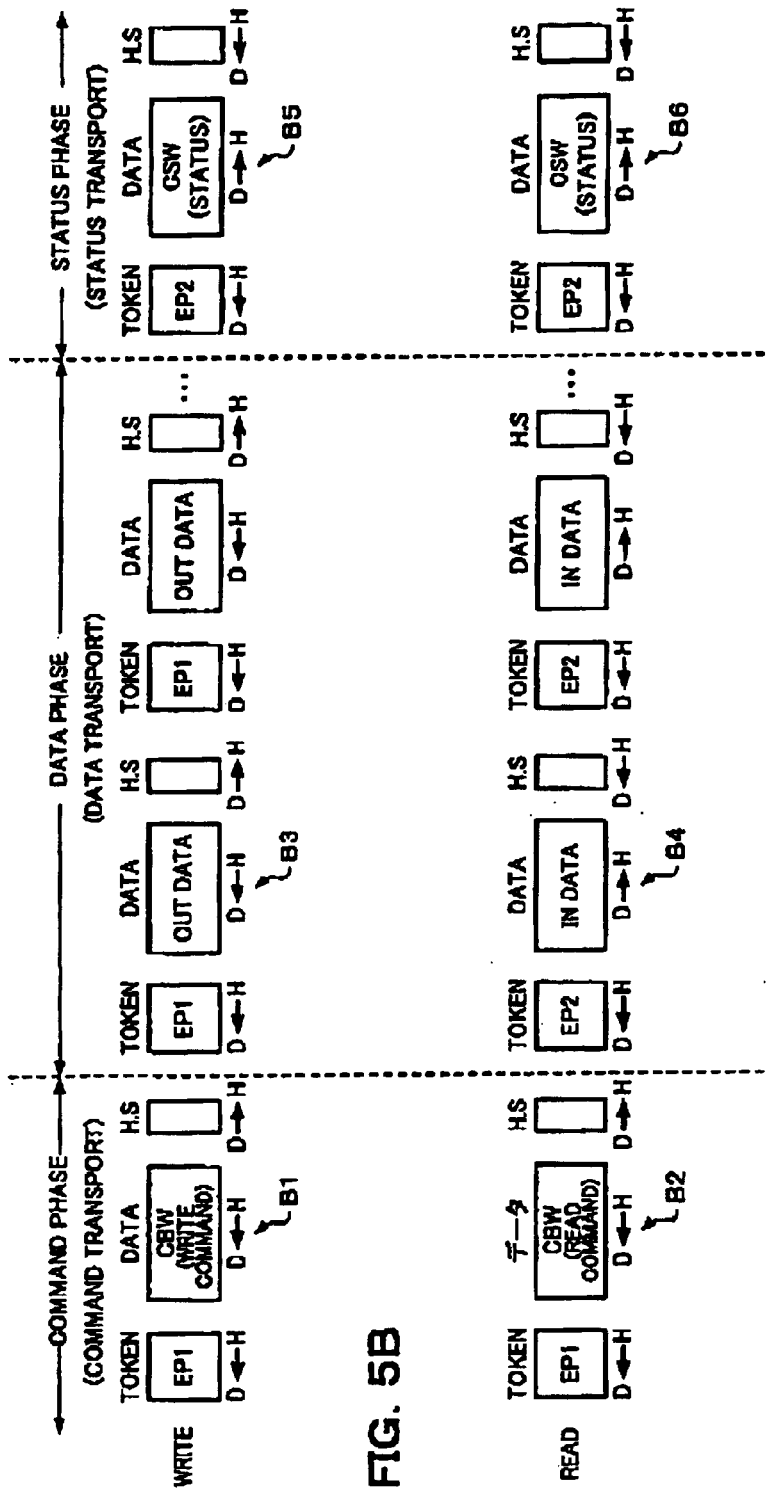

FIG. 14

AT END OF COMMAND PHASE (TOGGLE MISSING)

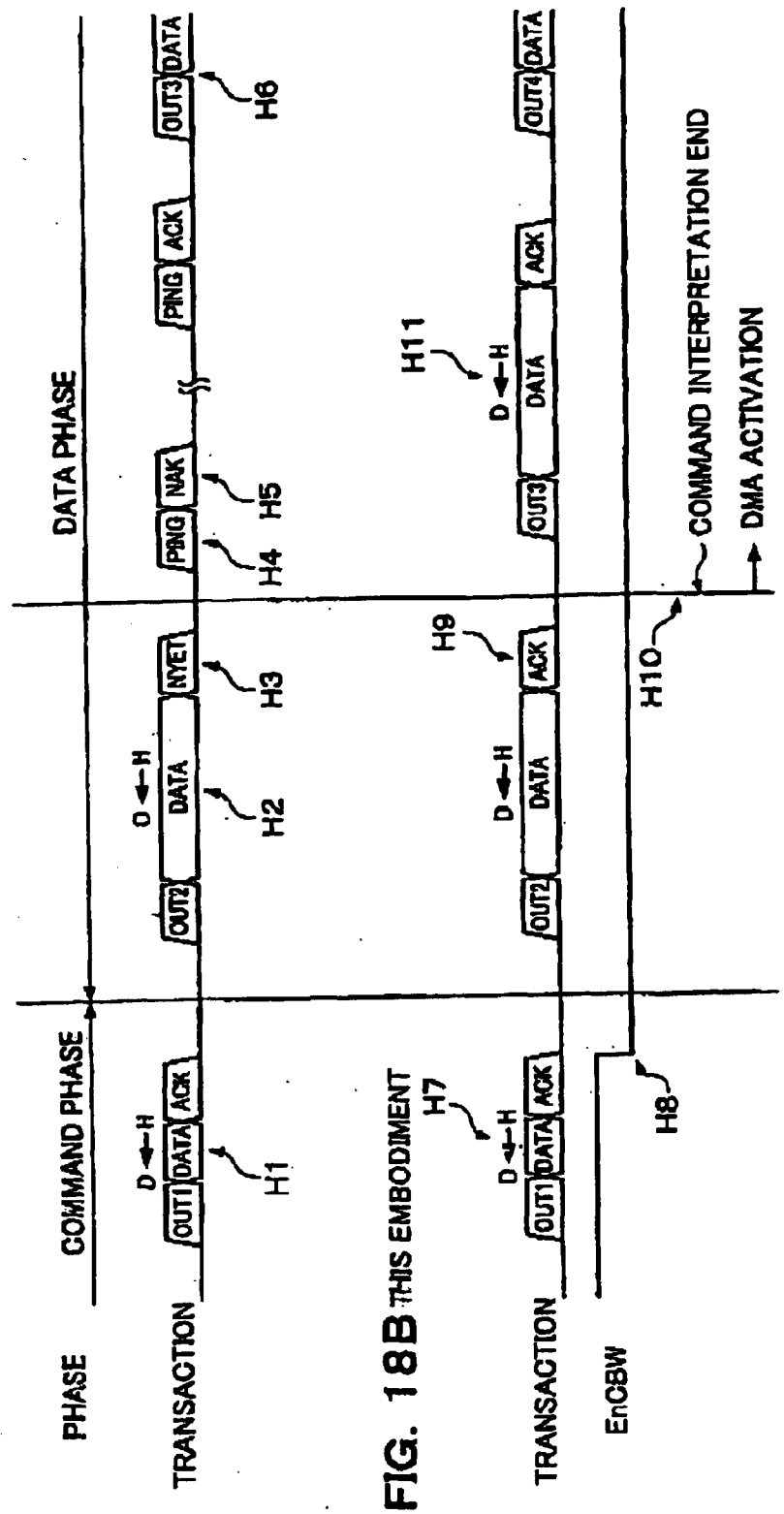

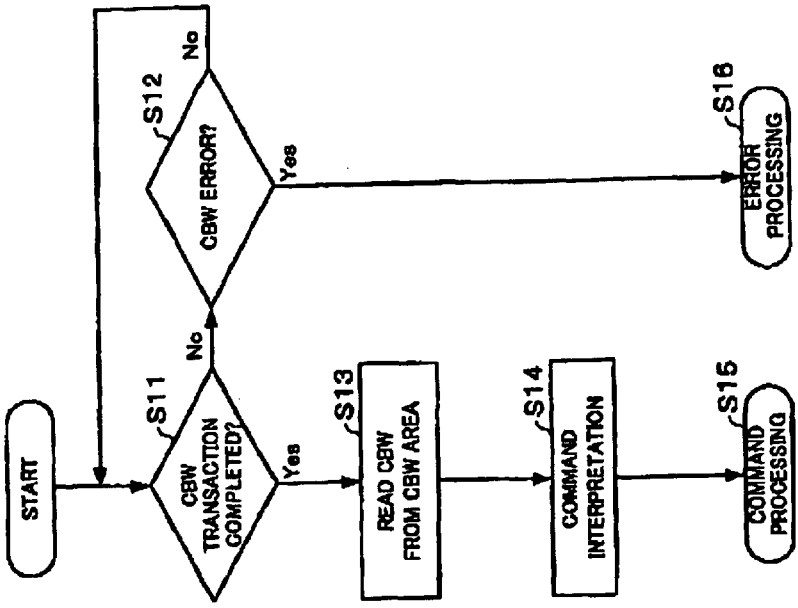
FIG. 19B THIS EMBODIMENT
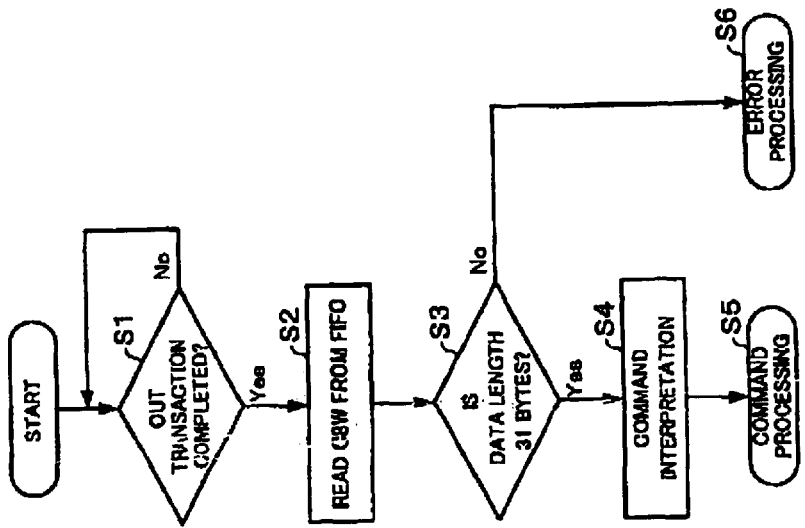
FIG. 19A COMPARATIVE EXAMPLE

DATA TRANSFER CONTROL DEVICE, ELECTRONIC EQUIPMENT, AND DATA TRANSFER CONTROL METHOD

Japanese patent application no. 2001-143429 filed on May 14, 2001 is hereby incorporated by reference in its entirety.

BACKGROUND OF THE INVENTION

The present invention relates to a data transfer control device, electronic equipment, and a data transfer control method.

The universal serial bus (USB) standard has recently attracted attention as an interface standard for connections between personal computers and peripheral equipment (broadly speaking: electronic equipment). This USB standard has the advantage of enabling the use of connectors of the same standard to connect peripheral equipment such as a mouse, keyboard, and printer, which are connected by connectors of different standards in the prior art, and of making it possible to implement plug-and-play and hot-plug features.

In comparison with the IEEE 1394 standard, which is also attracting notice as a standard for the same serial bus interface, this USB standard has a problem in that the transfer speed thereof is slower.

In this case, attention is focussed on the decision to use the USB 2.0 standard which can implement a data transfer speed of 480 Mbps (in HS mode), far faster than that of the previous USB 1.1 standard, while maintaining backward compatibility with USB 1.1.

With USB 2.0, data transfer is performed at 480 Mbps in high-speed (HS) mode. It therefore has the advantage of enabling its use as an interface for a storage device such as a hard disk drive or optical disk drive, which requires fast transfer speeds.

However, this means that the data transfer control device connected to the USB bus has to process data that is transferred at the high speed of 480 Mbps. If the processing speed of the data transfer control device or the firmware (CPU) that controls the data transfer control device is slow, it is not possible to ensure the effective transfer speed and a problem occurs in that the bus zone could be lost.

BRIEF SUMMARY OF THE INVENTION

One aspect of the present invention relates to a data transfer control device for data transfer through a bus, the data transfer control device comprising:

a buffer which includes a first storage area for a first information and a second storage area for a second information, the first and second storage areas being provided for one end point, when a plurality of types of informations including the first and second informations have been allocated as informations to be transferred through the one end point; and a buffer management circuit which writes information transferred from a host to an end point into the first storage area for the first information during a first phase in which the first information is transferred through the bus, and writes information transferred from the host to the end point into the second storage area for the second information during a second phase in which the second information is transferred through the bus.

Another aspect of the present invention relates to a data transfer control device for data transfer through a bus, the data transfer control device comprising:

a buffer which includes a command storage area for a command block and a data storage area for data, the command storage area and the data storage area being provided for one end point, when a command block packet and a data packet have been allocated as informations to be transferred through the one end point; and a buffer management circuit that switches an information write area from the command storage area for a command block to the data storage area for data and writes a data packet transferred from the host to the end point into the data storage area, when a phase switches from a command phase in which a command block packet is transferred through the bus to a data phase in which a data packet is transferred through the bus.

BRIEF DESCRIPTION OF THE SEVERAL VIEWS OF THE DRAWING

FIGS. 1A, 1B, 1C, and 1D are illustrative of end points and transaction configurations under USB;

FIGS. 2A and 2B are illustrative of the CBI specification and the Bulk-Only specification;

FIG. 3 shows the CBW format;

FIG. 4 shows the CSW format;

FIGS. 5A and 5B are illustrative of the writing and reading of data during Bulk-Only;

FIG. 14 is a timing waveform chart illustrative of the operation of one embodiment of the present invention when a data length error occurs;

FIGS. 18A and 18B are timing waveform charts of the comparative example and one embodiment of the present invention;

FIGS. 19A and 19B are flow charts of the firmware processing of the comparative example and one embodiment of the present invention;

DETAILED DESCRIPTION OF THE EMBODIMENT

Figure 6A:
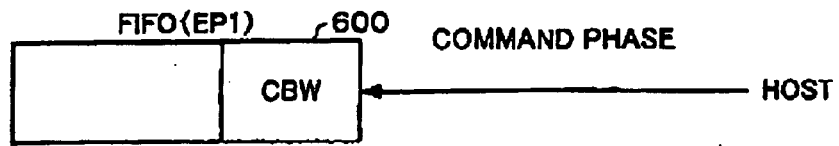
FIGS. 6A, 6B, 6C, and 6D are illustrative of a method in accordance with a comparative example.

Embodiments of the present invention are described below.

Note that the embodiments described hereunder do not in any way limit the scope of the invention defined by the claims laid out herein. Note also that all of the elements of these embodiments should not be taken as essential requirements to the means of the present invention.

According to one embodiment of the present invention, there is provided a data transfer control device for data transfer through a bus, the data transfer control device comprising:

a buffer which includes a first storage area for a first information and a second storage area for a second information, the first and second storage areas being provided for one end point, when a plurality of types of informations including the first and second informations have been allocated as informations to be transferred through the one end point; and a buffer management circuit which writes information transferred from a host to an end point into the first storage area for the first information during a first phase in which the first information is transferred through the bus, and writes information transferred from the host to the end point into the second storage area for the second information during a second phase in which the second information is transferred through the bus.

In the data transfer control device, a first storage area for a first information that is allocated to a given end point and a second storage area for a second information that is allocated to the same end point are provided in a buffer. During a first phase (first transport), information transferred from a host to an end point is written to the first storage area, and during a second phase (second transport), information transferred from the host to the end point is written to the second storage area. When a phase switches from the first phase to the second phase, by way of example, the information write area for the end point is switched from the first storage area to the second storage area.

This makes it possible to write a second information to the second storage area while a first information that has been written to the first storage area is being processed, even when a plurality of types of informations have been allocated to one end point. It is therefore possible to increase the processing speed of the data transfer control device and reduce the load on the unit that processes the first information, thus enabling an increase in the effective bus transfer speed.

In the data transfer control device, the first storage area for the first information may be set to be a randomly accessible area; and the second storage area for the second information may be set to be an area such that information that is input first thereto is output first therefrom.

This enables various improvements, such as in the processing speed of the unit that processes the first information that has been written to the first storage area.

In the data transfer control device, at least one of a command block indicating the transfer of the second information and length information of the second information, the transfer thereof being indicated by a command block, may be written into an area other than a start address of the first storage area for the first information.

In such a case, this embodiment makes it possible to read information such as a command block and length information by random access, enabling various improvements, such as in the processing speed of the unit that processes the first information.

In the data transfer control device, a write area for information transferred from the host to the end point may be switched from the first storage area to the second storage area, on condition that an acknowledgment concerning data transfer in the first phase has been returned to the host.

This makes it possible to implement error-free, reliable area switching with a low processing load.

In the data transfer control device, switching from the first storage area to the second storage area may not be performed on condition that an error occurs in a data toggle bit for synchronizing a transaction sequence with the host, even when an acknowledgment has been returned to the host.

This enables the implementation of appropriate data transfer processing, even if an error occurs in the data toggle bit (toggle missing).

In the data transfer control device, the first information may be a command block packet; and the second information may be a data packet to be transferred by an indication of the command block.

It should be noted, however, that the types of the first and second informations stored in the first and second storage areas in accordance with this embodiment may be set as desired.

In the data transfer control device, a data packet may be written to the second storage area while a processing unit is interpreting the command block packet.

This makes it possible to begin the processing of transferring data through the second storage area at an earlier timing, thus enabling an increase in the effective transfer speed of the bus, when a phase switches from a command phase (command transport) to a data phase (data transport).

According to another embodiment of the present invention, there is provided a data transfer control device for data transfer through a bus, the data transfer control device comprising:

a buffer which includes a command storage area for a command block and a data storage area for data, the command storage area and the data storage area being provided for one end point, when a command block packet and a data packet have been allocated as informations to be transferred through the one end point; and a buffer management circuit that switches an information write area from the command storage area for a command block to the data storage area for data and writes a data packet transferred from the host to the end point into the data storage area, when a phase switches from a command phase in which a command block packet is transferred through the bus to a data phase in which a data packet is transferred through the bus.

In the data transfer control device, a command storage area for a command block packet allocated to a given end point and a data storage area for a data packet allocated to the same end point are provided in a buffer. When a phase switches from the command phase (command transport) to the data phase (data transport), the information write area for that end point is switched from the command storage area to the data storage area.

This makes it possible to write a data packet to the data storage area while performing processing on a command block packet that has been written to the command storage area, even if both a command block packet and a data packet have been allocated to one endpoint. It is therefore possible to increase the processing speed of the data transfer control device and reduce the load on the unit that processes the command block packet, thus enabling an increase in the effective bus transfer speed.

In the data transfer control device, data transfer may be in accordance with the universal serial bus (USB) standard.

It should be noted, however, that this embodiment could also be applied to standards other than USB (or other standards that inherit the concept of USB).

Electronic equipment in accordance with one embodiment of the present invention comprises any of the above described data transfer control devices; and a device which performs output processing, fetch processing, or storage processing on data transferred through the data transfer control device and the bus.

Since this embodiment makes it possible to reduce the processing load on the processing unit (such as the firmware) that controls the data transfer of the data transfer control device, it enables benefits such as reductions in the cost and scale of electronic equipment. This embodiment also enables data transfer in fast transfer modes, thus increasing the speed of processing of the electronic equipment.

This embodiment is described in more detail below with reference to the accompanying figures.

1. USB 1.1 Data Transfer Method

The data transfer method in accordance with USB (USB 2.0) will first be described briefly.

USB differs from other methods such as IEEE 1394 in that a host takes the initiative. In other words, activation of a data transfer transaction is done by the host side and the greater part of control relating to data transfer is done by the host. This increases the processing load on the host, but since the personal computer (PC) that forms the host has a high-speed, high-performance CPU (processor), the processing of such a heavy load is not too much of a problem.

Since the device (target) need only respond to a request from the host under USB, the processing and configuration on the device side may be simplified. It is therefore not necessary to use a high-performance, fast CPU on the device side, such as the host, making it possible to use an inexpensive CPU (microprocessor), thereby reducing costs.

To implement this data transfer under USB, with the host taking the lead, end points (EP0 to EP15) are provided on the device side, as shown in FIG. 1A. In this case, an end point is equivalent to an entrance to a buffer (FIFO) for data transfer between the host and the device, where all of the data transfer done under USB is done through these end points.

Each of these end points may be addressed uniquely by a device address and an end point number. In other words, the host can freely perform data transmission to a desired end point or data reception from a desired end point, by specifying a device address and an end point number.

End point specification is done freely by the device side, and the host may be notified of details such as the allocation of end point numbers and the sizes of storage areas allocated to those end points, during enumeration processing.

Note that USB provides control transfer, isochronous transfer, interrupt transfer, and bulk transfer as data transfer types.

In this case, control transfer is a transfer mode for control performed through a control end point between the host and the device (target). This control transfer sends information such as configuration information for initializing the device.

Isochronous transfer is a transfer mode that is provided for transferring data where it is more important to ensure bandwidth rather than correctness, such as image data or audio data. Since this isochronous transfer ensures that a fixed quantity of data may be transferred in a fixed period, it is an effective transfer mode for applications where real-time data capabilities are important.

Interrupt transfer is a transfer mode that is provided for transferring a small quantity of data at a comparatively low transfer speed.

Bulk transfer is a transfer mode that is provided for transferring a large quantity data that occurs at irregular periods. This bulk transfer enables data transfer at spare times other than times being used by isochronous transfers or interrupt transfers, and also enables checking of the correctness of the data. It is therefore an effective transfer mode for data transfer where real-time capabilities are not important but data reliability may be ensured.

1.2 Transaction Configuration

A transaction in USB bulk transfer mode is basically made up of three packets as shown in FIG. 1B: a token packet, a data packet, and a handshake packet. Note that a handshake packet is not necessary with isochronous transfer.

In this case, a token packet is a packet that is used in situations such as when the host requests a read or write with respect to an end point of the device (target). This token packet has fields such as PID (a packet ID such as OUT, IN, SOF, or SETUP), ADDR (device address), ENDP (end point number), and CRC (Cyclic Redundancy Check), by way of example.

A data packet is a packet for sending the actual data, and has PID (DATA0, DATA1), DATA (the actual data), and CRC fields.

A handshake packet is a packet used by the reception side to inform the transmitter side whether or not data reception was successful, and has a PID (ACK, NAK, or STALL) field.

With an OUT transaction (a transaction whereby the host outputs information to the device), the host first sends an OUT token packet to the device, as shown in FIG. 1C. The host then sends an OUT data packet to the device. If the device succeeds in receiving the OUT data packet, it sends an ACK handshake packet to the host.

With an IN transaction (a transaction whereby the host inputs information from the device), on the other hand, the host first sends an IN token packet to the device, as shown in FIG. 1D. On receiving the IN token packet, the device sends an IN data packet to the host. If the host succeeds in receiving the IN data packet, it sends an ACK handshake packet to the device.

In FIGS. 1C and 1D, note that "D←H" in the figures means that information is transferred from the host to the device and "D→H" means that information is transferred from the device to the host (this convention is used hereinafter in the figures and descriptions"

1.3 Bulk-Only

USB devices are divided into a number of classes. Devices such as hard disk drives and optical disk drives belong to a class called mass storage, and there are specifications created by the vendors of electronic equipment within this mass storage class, such as control/bulk/interrupt (CBI) and Bulk-Only specifications.

With the CBI specification, the device provides end points EP0, EP1, EP2, and EP3 for control, bulk-out, bulk-in, and interrupt, as shown in FIG. 2A. In this case, the end point EP0 is for the transfer of USB-layer control packets or command packets. EP1 is for the transfer of OUT data (data transferred from the host to the device), EP2 is for the transfer of IN data (data transferred from the device to the host), and EP3 is for the transfer of interrupt IN packets. Note that any of EP1 to EP15 may be allocated as bulk-out, bulk-in, and interrupt IN end points, from the device side.

With the Bulk-Only specification, on the other hand, the device provides end points EP0, EP1, and EP2 for control, bulk-out, and bulk-in, as shown in FIG. 2B. In this case, the end point EP0 is for the transfer of USB-layer control packets. EP1 is for the transfer of commands (CBW) and OUT data, and EP2 is for the transfer of statuses (CSW) and IN data packets. Note that any of EP1 to EP15 may be set to be bulk-out and bulk-in end points, from the device side.

In this case, a command block wrapper (CBW) is a packet that includes a command block and information relating to the command blocks, and has the format shown in FIG. 3. A command status wrapper (CSW) is a packet that includes the status of a command block, and has the format shown in FIG. 4.

In FIG. 3, dCBWSignature is information for identifying that packet as a CBW, dCBWTag is a command block tag, and dCBWDataTransferLength specifies the length of data to be transferred in the data phase. The bmCBWFlags field is a flag for specifying the transfer direction or the like. dCBWLUN is a logical unit number, bcBWCBLength is the command length, and CBWCB is a command block in which an ATA/ATAPI or SCSI command is encapsulated and described.

In FIG. 4, dCSWSignature is information for identifying that packet as a CSW, dCSWTag is a status block tag, and the value of the dCBWTag of the CBW corresponding to that CSW is written therein. The CSWDataResidue field gives the difference between the length of data specified by dCBWDataTransferLength of the CBW and the length of data that the device has actually processed, and bCSWStatus is a status block.

The description now turns to the processing for writing or reading data under the Bulk-Only specification of FIG. 2B, with reference to FIGS. 5A and 5B.

When the host writes data to the device, it first performs a command phase (command transport) in which it transfers a CBW to the device, as shown in FIG. 5A. More specifically, the host transfers a token packet specifying the end point EP1 to the device, then transfers a CBW (see A1 in FIG. 2B and FIG. 3) to the end point EP1 of the device. This CBW includes a write command. If the device returns a handshake (H.S) to the host, the command phase ends.

When the command phase (command transport) ends, the data phase (data transport) starts. In this data phase, the host first transfers a token packet specifying the end point EP1 of the device, then it transfers OUT data (see A2 in FIG. 2B) to the end point EP1 of the device. Each transaction ends when an ACK handshake is returned from the device to the host. Transactions are repeated in this manner and the data phase ends when data has been transferred up to the data length specified in dCBWDataTransferLength of the CBW (see FIG. 3).

When the data phase (data transport) ends, a status phase (status transport) starts. In this status phase, the host first transfers a token packet specifying the end point EP2 to the device. When that happens, the device transfers the CSW that is at the end point EP2 (see A3 in FIG. 2B and FIG. 4) to the host. The status phase ends when an ACK handshake is returned from the host to the device.

When the host reads data, it first transfers a token device specifying the end point EP1 to the device, as shown in FIG. 5B, then it transfers the CBW to the end point EP1 to the device. This CBW includes a read command. If a handshake returns from the device to the host. The command phase ends.

When the command phase ends, the data phase starts. In this data phase, the host first transfers a token packet specifying the end point EP2 to the device. When that happens, the device transfers the IN data that is at the end point EP2 (see A4 in FIG. 2B) to the host, and one transaction ends. Transactions are repeated in this manner and the data phase ends when data has been transferred up to the data length specified in dCBWDataTransferLength of the CBW.

When the data phase ends, the status phase starts. The processing in this status phase is similar to that of data write processing described with reference to FIG. 5A.

2. Characteristics of this Embodiment 2.1 Area Switching

The CBI specification shown in FIG. 2A relates to a specification by which the host transfers a token to the device within a fixed period. For that reason, this has a disadvantage in that the processing load on the host and the processing load on the device that receives this token are heavy.

That is why the Bulk-Only specification of FIG. 2B is currently popular.

With this Bulk-Only specification, however, several types of informations are allocated as informations to be transferred through one end point. More specifically, a CBW (command) and OUT data are allocated as informations to be transferred through the bulk-out end point EP1, and a CSW (status) and IN data are allocated as informations to be transferred through the bulk-in end point EP2, as shown in FIG. 2B. The host and device must therefore distinguish which type of information is to be transferred through each of the end points. With the Bulk-Only specification, the host and the device determine what phase is the current phase and also distinguish this information.

Since the current phase is the command phase at B1 and B2 of FIGS. 5A and 5B, by way of example, it is determined that the information to be transferred through the end point EP1 is a command (CBW). Since the current phase is the data phase at B3 and B4, it is determined that the information to be transferred through the end point EP1 is OUT data and the information to be transferred through the end point EP2 is IN data. Furthermore, since the current phase is the status phase at B5 and B6, it is determined that the information to be transferred through the end point EP2 is a status (CSW).

Since the Bulk-Only specification ensures that data transfer is such that there is always matching between the phases at the host and the device, appropriate data transfer is possible, even when several types of informations (CBW and OUT data or CSW and IN data) are allocated to one end point.

However the following problem has been found with the Bulk-Only specification.

A method in accordance with a comparative example to this embodiment is shown in FIGS. 6A to 6D, by way of example. In this comparative example, a CBW (command) is written from the host to a FIFO (EP1) 600 that uses the endpoint EP1 as an entrance, during a command phase, as shown in FIG. 6A.

Figure 6B:
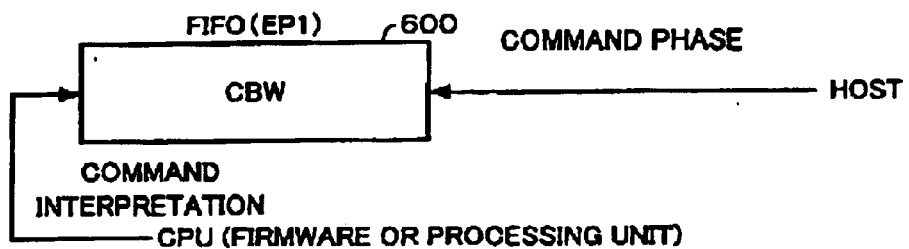

When that happens, the CPU (firmware or processing unit) on the device side reads the CBW written to the buffer 60 in first-in, first-out sequence, as shown in FIG. 6B, and interprets the command. In this case, no more data from the host may be written to the FIFO 600 until this CPU command interpretation (command decoding) ends. The device therefore returns NAK to the host, even if a transition to dataphase occurs and a token for transferring OUT data is output from the host, as shown in FIG. 6C.

The OUT data from the host is written to the FIFO 600 and that OUT data is transferred by DMA transfer to a device such as a hard disk drive in a later stage, on condition that CPU command interpretation has ended and the FIFO 600 has become empty, an shown in FIG. 6D.

In the comparative example shown in FIGS. 6A to 6D, OUT data cannot be written to the FIFO 600 in the period during which the CPU is interpreting (decoding) a command. The processing on the device side is therefore delayed by that period, reducing the effective data transfer speed.

Figure 6C:
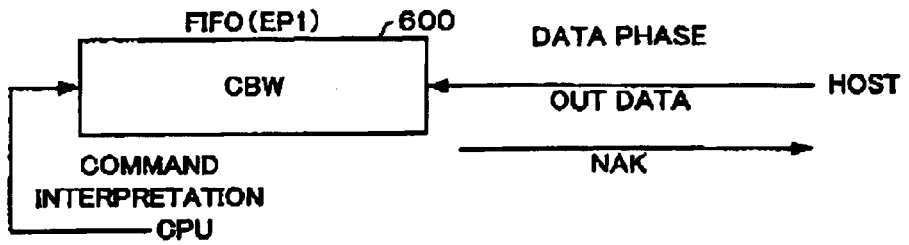
Figure 6D:
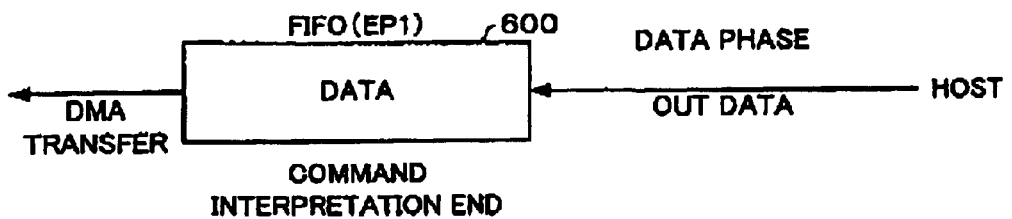

In this case, since the bus transfer speeds under USB 1.1 were so low, the delays in processing on the device side as shown in FIGS. 6B and 6C caused substantially no problems.

However, HS mode of USB 2.0 enables data transfer at a fast speed of 480 Mbps. Data is therefore transferred at high speed from the host through USB. Therefore, the processing on the device side delays and the high-speed transfers of USB 2.0 will be impeded thereby. Thus the effective data transfer speed of the entire system will be greatly degraded.

In particular, it often happens that an inexpensive CPU that operates at a clock frequency of 20 to 50 MHz is used on the device side, from requirements of reduced cost. If the command interpretation of FIGS. 6B and 6C is extremely time-consuming, therefore, the delays in the effective data transfer speed will be even more serious.

In order to solve such problems, this embodiment uses a method of switching between storage areas in the buffer in accordance with the switching of phase (transport).

Figure 7A:
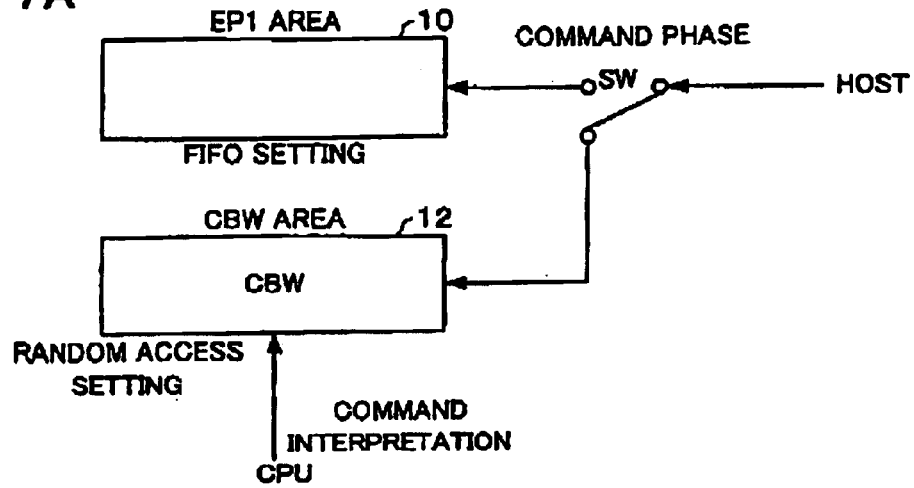
FIGS. 7A, 7B, and 7C are illustrative of a method in accordance with one embodiment of the present invention.

More specifically, a buffer that is a packet storage unit in accordance with this embodiment is provided with a CBW area 12 (first storage area: command storage area) for reading the CBW (first information: command block), in addition to an EP1 area 10 (second storage area: data storage area) for reading OUT data (second information), as shown in FIG. 7A.

In this case, both the EP1 area 10 and the CBW area 12 are storage areas that use the bulk-out end point EP1 as an entrance, The EP1 area 10 is set in such a manner that information that is input first thereto is output first therefrom (FIFO setting) and the CBW area 12 is set in such a manner that information therein may be randomly accessed (random access setting).

With this embodiment, a switch SW (switching unit) is turned towards the CBW area 12 side during the command phase (first phase), so that the CBW that is transferred in from the host is written to the CBW area 12. When that happens, the CPU is (firmware or processing unit) reads the CBW that has been written to the CBW area 12, and interprets the command. Since the CBW area 12 has been set to be randomly accessible in such a case, The CPU can read information at any address in the CBW area 12, at high speed.

Figure 7B:
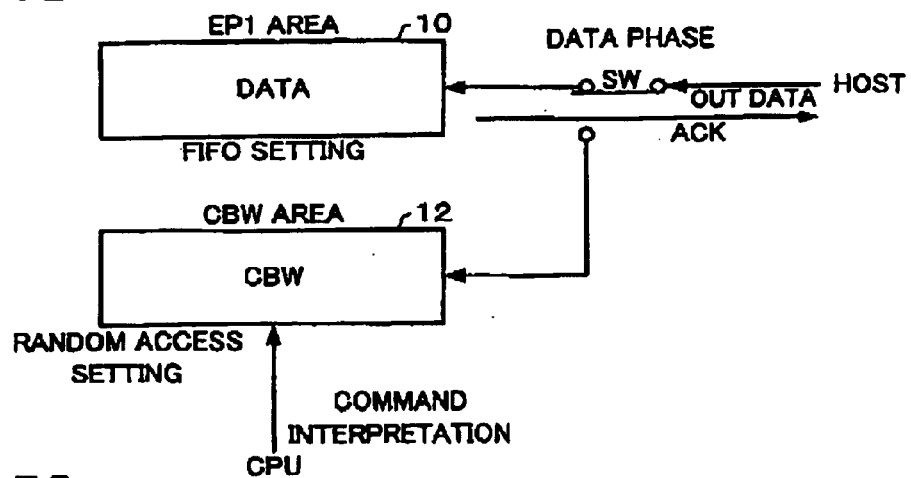
Figure 7C:
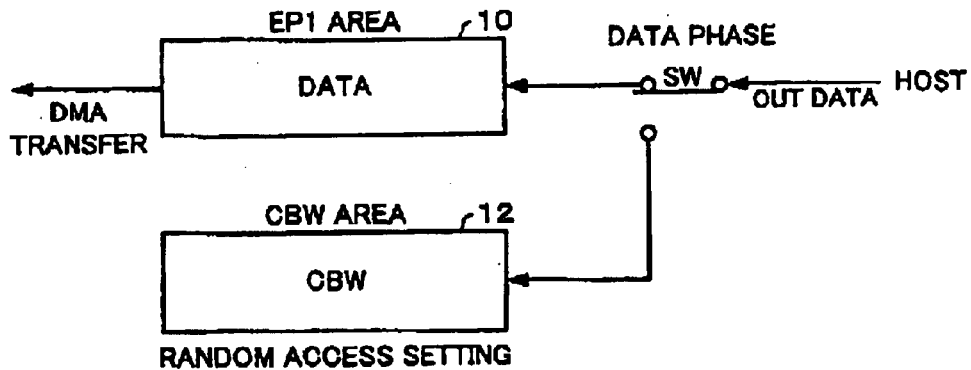

When a transition from the command phase (first phase) to the data phase (second phase) occurs, the switch SW is switched to the EP1 area 10 side, as shown in FIG. 7B. This enables writing of the OUT data from the host to the EP1 area 10. When the CPU command interpretation ends, DAM transfer starts to transfer the OUT data of the EP1 area 10 to a device such as a hard disk drive in a later stage.

With the comparative example of FIG. 6C, for example, OUT data from the host cannot be accepted while the CPU is interpreting a command, so it is inevitable that NAK is returned to the host.

In contrast thereto, this embodiment makes it possible to accept OUT data from the host and write it to the EP1 area 10, while the CPU is interpreting a command. It is therefore possible to return ACK to the host, which tends to increase the processing speed.

USB 2.0 in particular enables high-speed transfers of data from the host. If NAK is returned repeatedly to the host, as in the comparative example of FIG. 6C, the bus zone will therefore be lost and it will not be possible to utilize the high-speed data transfers of USB 2.0.

In contrast thereto, this embodiment makes it possible to return ACK to the host, as shown in FIG. 7B, making it possible to keep the loss of the bus zone to a minimum, enable use of the high-speed data transfers of USB 2.0, and thus increase the effective data transfer speed.

Figure 8A:
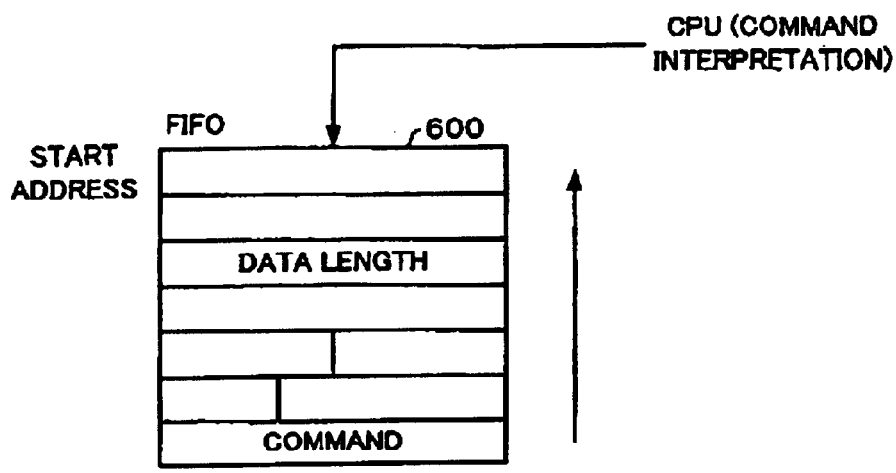
FIGS. 8A and 8B are illustrative of the advantage of a method of setting the CBW area to be randomly accessible.

With the comparative example, the CBW is stored in the first-in, first-out FIFO 600, as shown in FIG. 8A. The CPU therefore has to read the CBW in sequence from the start address in the FIFO 600, during command interpretation. As a result, it takes long time before the data length (dCBWDataTransferLength of FIG. 3) and command (CBWCB) that are important for command interpretation has been read, delaying the command interpretation even further.

Figure 8B:
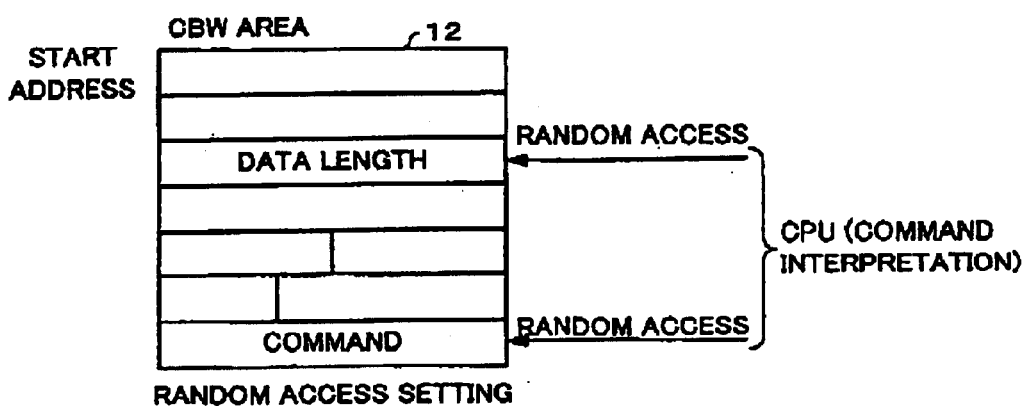

In contrast thereto, this embodiment ensures that the CBW is stored in the randomly accessible CBW area 12, as shown in FIG. 8B. The CPU can therefore first read the data length and command that are important for command interpretation, enabling a saving in the processing time for command interpretation. This enables a further increase in the effective data transfer speed.

Since the CBW area 12 of this embodiment is set to be randomly accessible, the data length and the command may be read first, even if the data length (length information for the second information) and command (command block indicating the transfer of the second information) are written to an area other than the start address of the CBW area 12 (the first storage area in which the first information is stored), enabling an increase in the effective data transfer speed.

To ensure that data may be transferred efficiently by DMA with respect to a later-stage device (such as a hard disk drive), it is desirable to have the EP1 area 10 set in such a manner that information that is input first thereto is output first therefrom (FIFO setting). In such a case, the EP1 area 10 could be set to be a first-in, first-out area by configuring it of serially-connected registers or memory, or is could be set to be a first-in, first-out area by controlling the address of RAM, as will be described later.

2.2 Configurational Example

Figure 9:
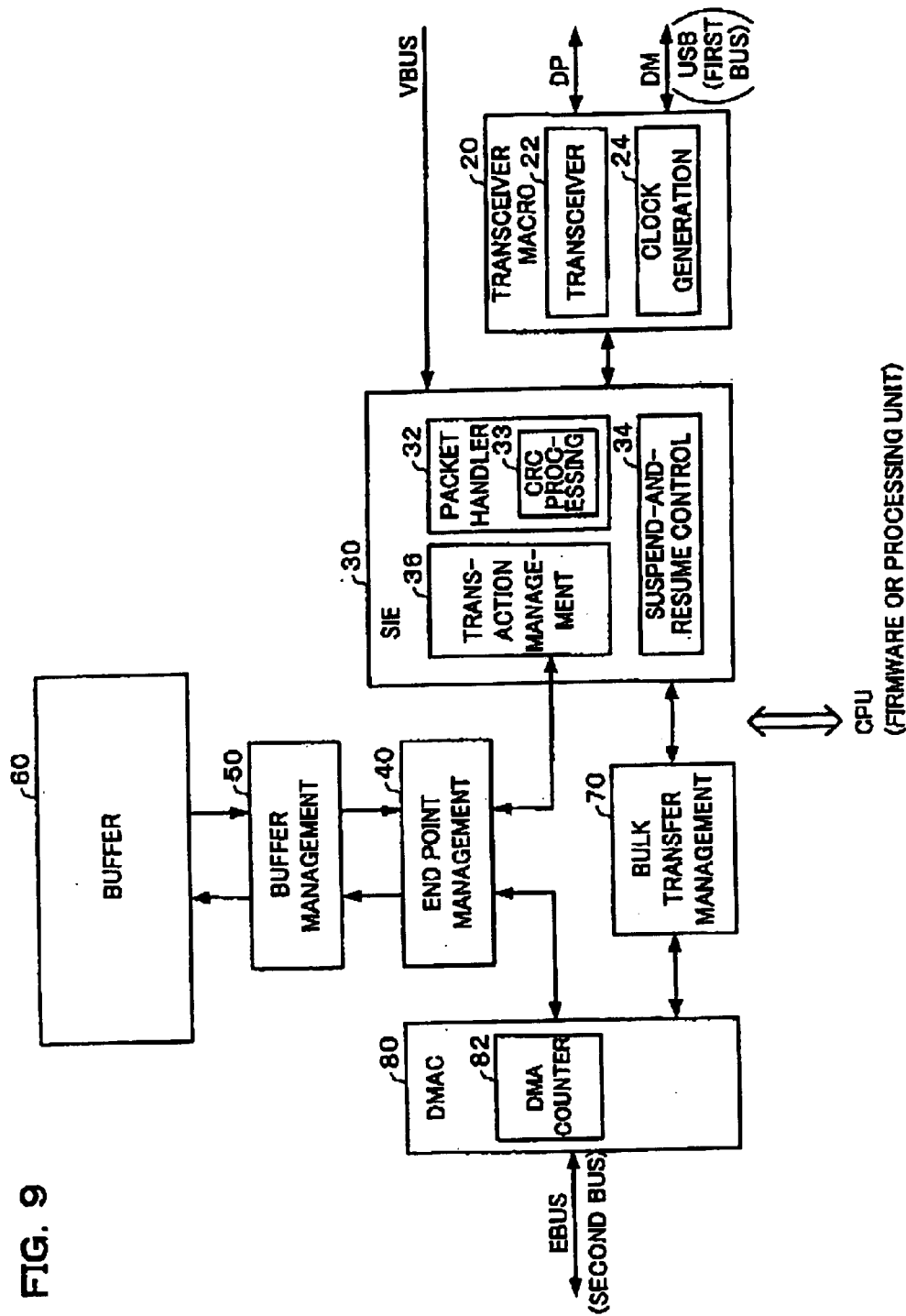
FIG. 9 shows a configuration of a data transfer control device according to one embodiment of the present invention.

A configurational example of the data transfer control device of this embodiment is shown in FIG. 9.

The data transfer control device of this embodiment includes a transceiver macro 20, an SIE 30, an end point management circuit 40, a buffer management circuit 50, a buffer 60, a bulk transfer management circuit 70, and a DMAC 80. Note that not all of the circuit blocks shown in FIG. 9 are necessary for the data transfer control device of the present invention, and thus some of them could be omitted.

In this case, the transceiver macro 20 is a circuit for implementing data transfer in FS mode or HS mode by USB (the first bus). A macro cell conforming to the USB 2.0 transceiver macrocell interface (UTMI), which defined interface specifications for parts of the physical-layer and logical-layer circuitry under USB 2.0, could be used as this transceiver macro 20, by way of example. This transceiver macro 20 includes a transceiver circuit 22 and a clock generation circuit 24.

The transceiver circuit 22 includes an analog front-end circuit (reception and transmission circuitry) for transmitting and receiving data by USB (a first bus), using difference signals DP and DM. It also includes circuitry for processing such as bit stuffing, bit unstuffing, serial-to-parallel conversion, parallel-to-serial conversion, NRZI decoding, NRZI encoding, and sampling clock generation.

The clock generation circuit 24 is a circuit for generating clocks such as those used in the generation of the operating clock or sampling clock used by the data transfer control device, and includes components such as PLLs and oscillation circuits for generating 480-MHz and 60-MHz clocks.

A serial interface engine (SIE) is a circuit which performs various types of processing such as USB packet transfer processing, and it includes a packet handler circuit 32, a suspend-and-resume control circuit 34, and a transaction management circuit 36.

The packet handler circuit 32 is a circuit for assembling (creating) or analyzing packets formed of headers and data, and it includes a CRC processing circuit 33 that generates and decodes CRCs.

The suspend-and-resume control circuit 34 is a circuit that performs sequence control during the suspension and resumption of processing.

The transaction management circuit 36 is a circuit for managing transactions made up of token, data, handshake, and other packets. More specifically, when a token packet is received, this circuit confirms whether or not that packet has the device's own address and, if it does have that address, it performs processing to transfer packets to or from the host, then processing for transferring a handshake packet.

The end point management circuit 40 is a circuit for managing the end points that form entrances to the various storage areas of the buffer, and it includes components such as registers (a register set) for storing attribute information for those end points.

The buffer management circuit 50 is a circuit for managing the buffer 60, and is formed of components such as RAM. More specifically, it generates write addresses or read addresses and performs processing to write data to the buffer 60 or read data from the buffer 60.

The buffer 60 (packet storage unit) is designed to store data (packets) temporarily, for transfer through USB and it has various functions such as compensating for any speed difference between the data transfer speed of USB (the first bus) and the data transfer speed of EBUS (the second bus). Note that EBUS is an external bus that connects together devices such as hard disk drives, CD drives, and scanners.

With this embodiment, if several types of informations are allocated as informations to be transferred through one end point, a first storage area (such as a data storage area) for a first information (such as a command block) and a second storage area (such as data) are provided (ensured) on the buffer 60.

The bulk transfer management circuit 70 is a circuit for managing bulk transfers under USB.

The DMAC 80 is a DMA controller which performs DMA transfers through EBUS, and includes a DMA counter 82. The DMA counter 82 is a circuit for counting the size of data (number of transfers) to be transmitted or received through EBUS.

2.3 Detailed Configurational Example

Figure 10:
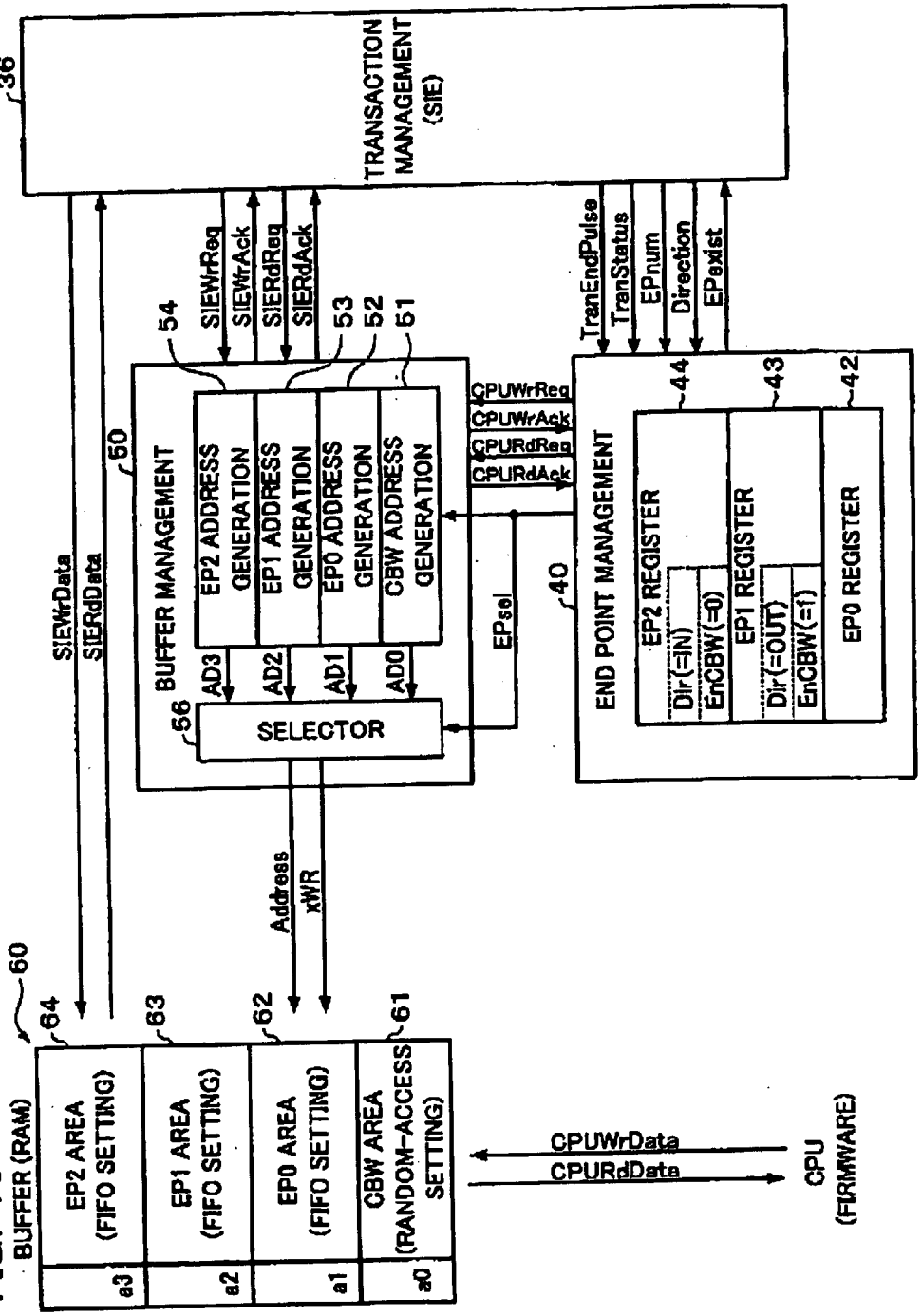
FIG. 10 shows a detailed example of the configuration of the transaction management circuit, end point management circuit, buffer management circuit, and buffer.

A detailed example of the configuration of the transaction management circuit 36 (SIE), The end point management circuit 40, the buffer management circuit 50, and the buffer 60 is shown in FIG. 10.

The buffer 60 (RAM) includes a CBW area 61 for storing a CBW (command block) that is information allocated to the end point EP1, an EP0 area 62 for storing information allocated to EP0, an EP1 area 63 for storing information allocated to EP1, and an EP2 area 64 for storing information allocated to EP2.

In FIG. 10, the CBW area 61 is set in such a manner that it may be accessed randomly by the CPU (firmware or processing unit). The EP0, EP1, and EP2 areas 62, 63, and 64, on the other hand, are set in such a manner that information that is input first thereto is output first therefrom (FIFO).

The transaction management circuit 36 outputs to the buffer 60 write data SIEWrData (a write packet) that has been transferred through USB, and inputs read data SIERdData (a read packet) from the buffer 60.

The transaction management circuit 36 also outputs a write request signal SIEWrReq and a read request signal SIERdReq to the buffer management circuit 50, and receives a write acknowledge signal SIEWrAck and a read acknowledge signal SIERdAck from the buffer management circuit 50.

The transaction management circuit 36 further outputs a transaction end signal TranEndPulse, a transaction status signal TranStatus, an end point number specification signal EPnum, and a transfer direction specification signal Direction to the end point management circuit 40, and receives an end point presence signal EPexist from the end point management circuit 40.

The end point management circuit 40 includes registers (a register set) 42, 43, and 44 for describing attribute information of each end point (such as end point number and maximum packet size). It also generates an end point selection signal EPsel based on various signals from the transaction management circuit 36 and the attribute information in the registers, for output to the buffer management circuit 50.

The end point management circuit 40 also outputs a write request signal CPUWrReq and a read request signal CPURdReq from the CPU to the buffer management circuit 50, and receives a write acknowledge signal CPUWrAck and a read acknowledge signal CPURdAck sent from the buffer management circuit 50 to the CPU.

The EP0 register 42 included within the end point management circuit 40 is a register for describing attribute information of the control end point that is defined as default by the USB specification.

The EP1 and EP2 registers 43 and 44 are registers used for describing attribute information of the bulk-out and bulk-in endpoints that are defined by the Bulk-Only specification. Note that any of the end points EP1 to EP15 may be set to be the bulk-out or bulk-in end point, from the device side.

The EP1 register 43 causes a flag DIR, which indicates the data transfer direction, to be set to OUT and EP1 to be set to be the bulk-out end point.

The EP1 register 43 also sets a flag EnCBW to 0. This flag EnCBW is used for connecting the end point to the CBW area 61 of the buffer 60, so that if EnCBW is set to 1, the bulk-in end point is connected to the CBW area 61.

With the EP2 register 44, the flag DIR indicating the data transfer direction is set to IN and EP2 is set to be the bulk-in end point.

With the EP2 register 44, EnCBW is set to 0.

The buffer management circuit 50 receives a write or read request signal from the transaction management circuit 36 or the end point management circuit 40 and the end point selection signal EPsel from the end point management circuit 40, and outputs an address Address and a write pulse xWR (where "x" means negative logic) to the buffer 60. This buffer management circuit 50 includes CBW, EP0, EP1, and EP2 address generation circuits 51, 52, 53, and 54, and a selector 56.

In this case, the CBW address generation circuit 51 generates a write or read address AD0 for SIEWrData or SIERdData, for the CBW area 61 (start address a0).

Similarly, the EP0, EP1, and EP2 address generation circuits 52, 53, and 54 each generate a write or read address AD1, AD2, or AD3 for SIEWrData or SIERdData, for the EP0, EP1, or EP2 area 62, 63, or 64 (start address a2, a3, or a4), respectively. More specifically, they generate sequentially incremented (or decremented) addresses AD1, AD2, and AD3 as start addresses a1, a2, and a3.

The selector 56 selects one of AD0 to AD3, based on EPsel, and outputs it to the buffer 60 as the Address, and it also outputs the write pulse xWR to the buffer 60. More specifically, AD0 is selected as Address for output to the buffer 60 if CBW is specified by EPsel, AD1 is selected therefor EP0 is specified, AD2 is selected therefor if EP1 is specified, and AD3 is selected therefor if EP2 is specified.

Note that the configuration is such that CPURdData may be written by the CPU to the CBW area 61. In that case, the buffer management circuit 50 is configured to output Address for reading CPURdData to the buffer 60, based on Epsel and CPURdReq from the end point management circuit 40.

Figure 11:
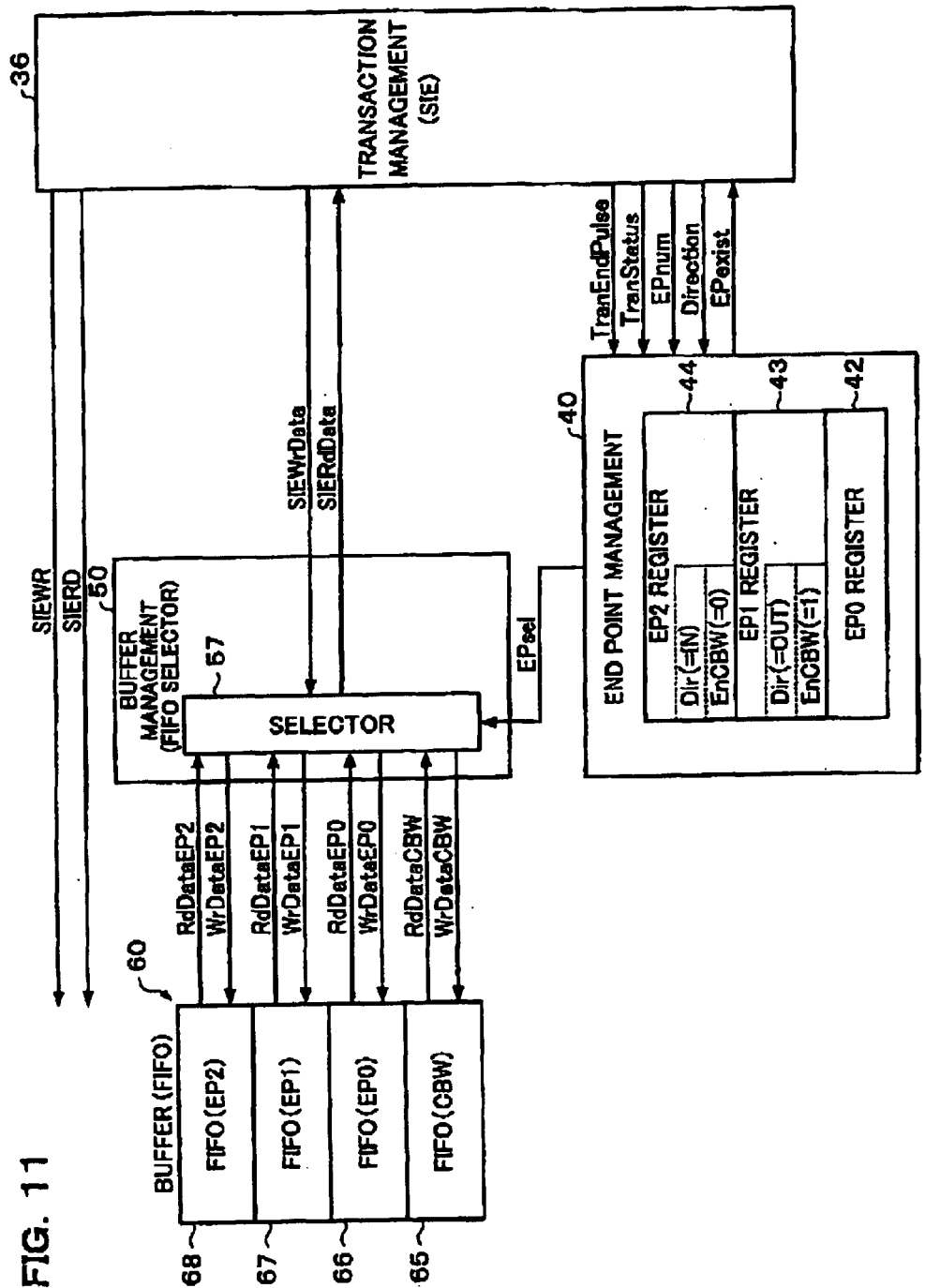
FIG. 11 shows another detailed example of the configuration of the transaction management circuit, end point management circuit, buffer management circuit, and buffer.

Another example of the configuration of the transaction management circuit 36, the end point management circuit 40, the buffer management circuit 50, and the buffer 60 is shown in FIG. 11.

FIG. 11 differs from FIG. 10 in that the buffer 60 includes FIFOs 65, 66, 67, and 68 (such as serially connected registers or memory) for CBW, EP0, EP1, and EP2.

A selector 57 included by the buffer management circuit 50 outputs SIEWrData from the transaction management circuit 36 to the buffer 60 as one of WrDataCBW, WrDataEP0, WrDataEP1, or WrDataEP2, based on EPsel from the end point management circuit 40.

Alternatively, the selector 57 selects, one of RdDataCBW, RdDataEP0, RdrlataEP1, or RdDataEP2 from the buffer 60, based on EPsel, and outputs it as SIERdData to the transaction management circuit 36.

More specifically, WrDataCBW and RdDataCBW are selected if CBW is specified by EPsel, WrDataEP0 and RdDataEP0 are selected if EP0 is specified, WrDataEP1 and RdDataEP1 are selected if EP1 is specified, and WrDataEP2 and RdDataEP2 are selected if EP2 is specified.

The writing of data to the buffer 60 is done by a write pulse SIEWR from the transaction management circuit 36, and the reading of data from the buffer 60 is done by a read pulse SIERD from the transaction management circuit 36.

Note that the FIFO 65 (CBW) of FIG. 11 could be set to be a randomly accessible storage area.

2.4 Operation

Timing waveform charts that illustrate details of the operation of the data transfer control device of this embodiment are shown in FIGS. 12 to 16.

2.4.1 If Successful

Figure 12:
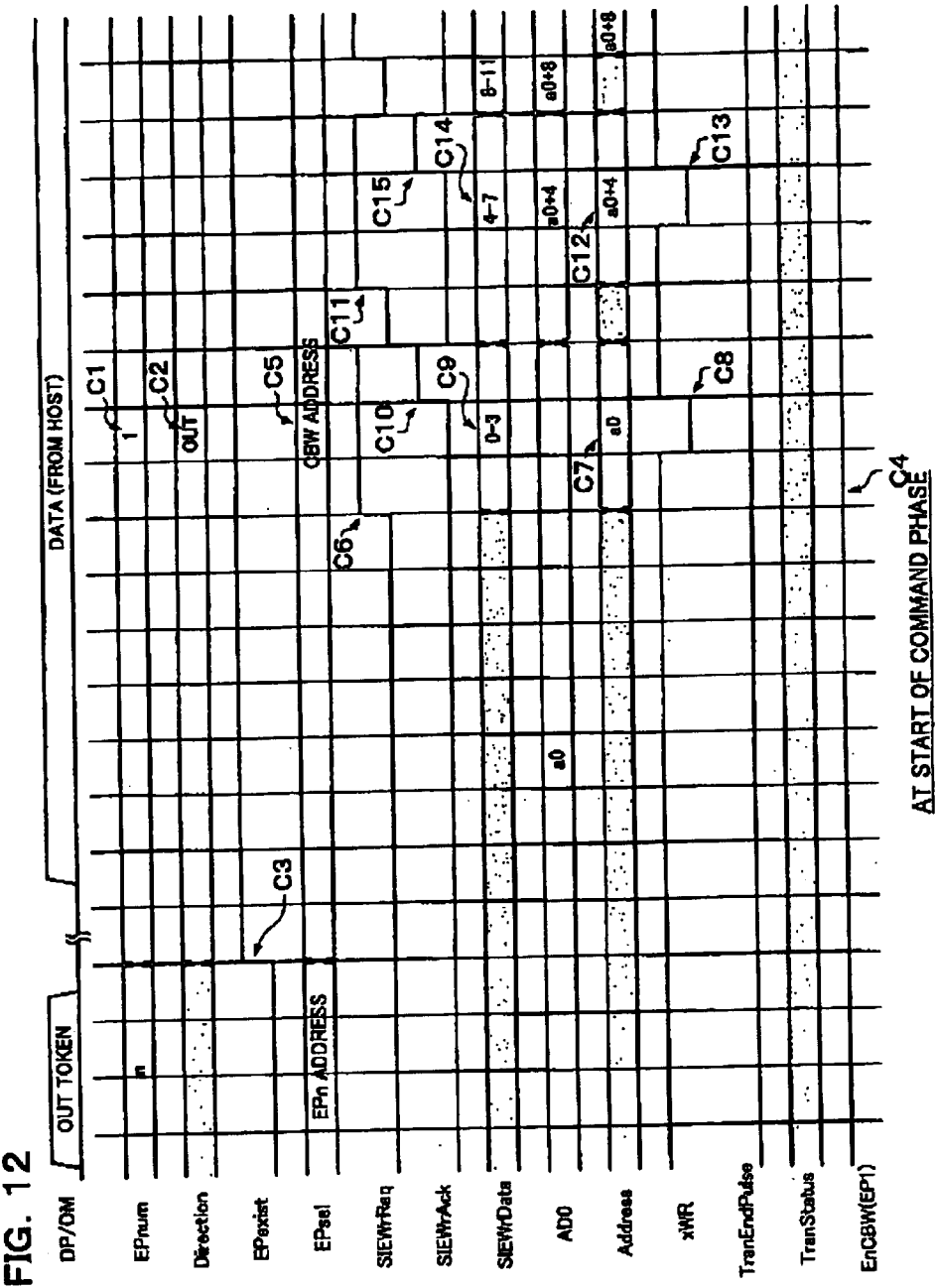
FIG. 12 is a timing waveform chart illustrative of the operation of one embodiment of the present invention at the beginning of the command phase.
Figure 13:
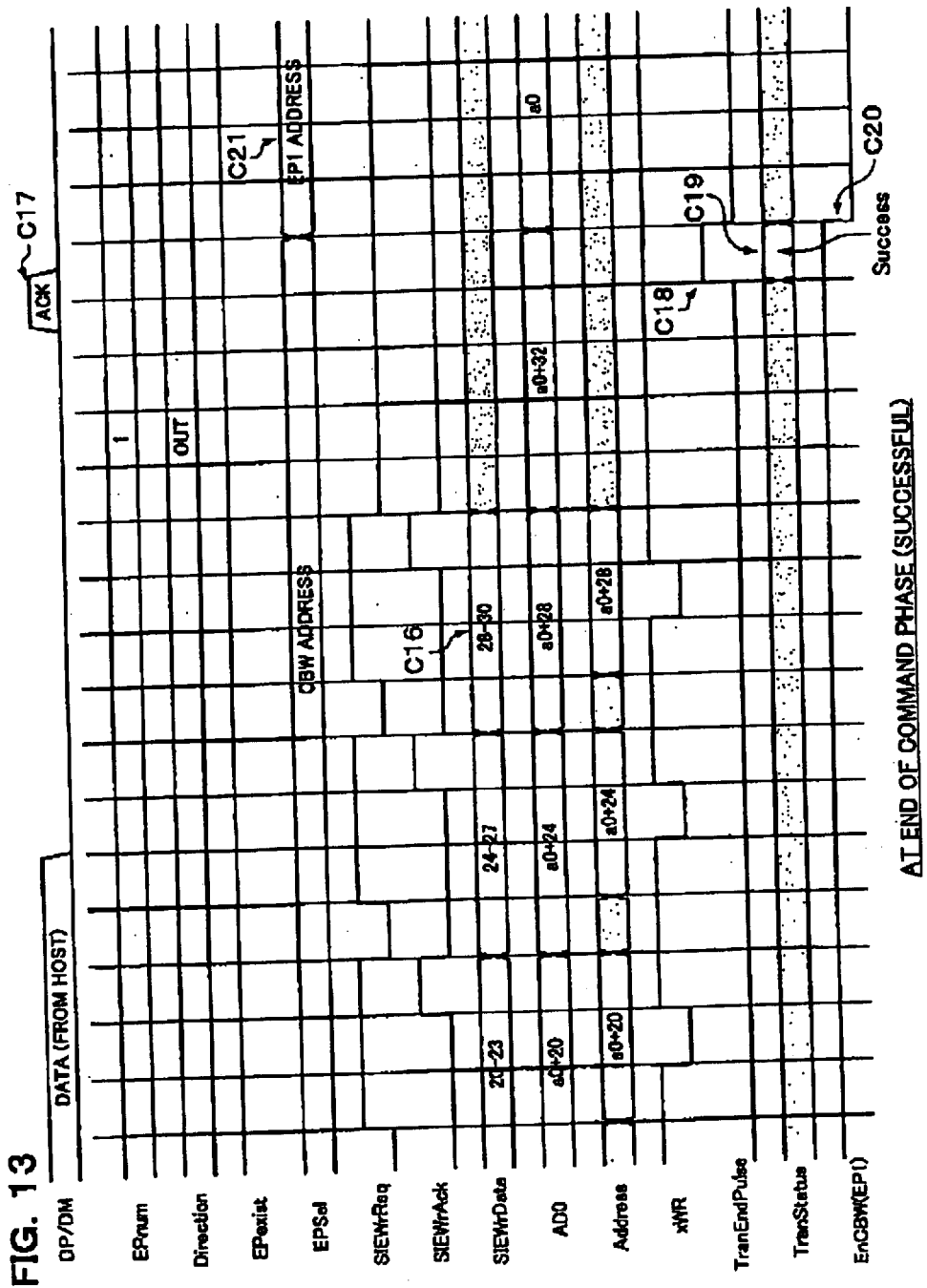
FIG. 13 is a timing waveform chart illustrative of the operation of one embodiment of the present invention at the successful data transfer.

The timing waveform chart of FIG. 12 shows the beginning of the command phase (B1 in FIG. 5A) and the timing waveform chart of FIG. 13 shows the end of the command phase.

As shown at C1 and C2 in FIG. 12, if the transaction management circuit 36 sets EPnum to 1 (end point number= 1) and Direction to OUT, the presence of the register 43 for the bulk-out end point EP1 (see FIG. 10) causes the end point management circuit 40 to make EPexist go active at C3.

Since the EnCBW for the end point EP1 is set to high (1) at this point, as shown at C4, the end point management circuit 40 outputs EPsel, which specifies the address AD0 of the CBW area 61, to the buffer management circuit 50. This causes the selector 56 of the buffer management circuit 50 to select the address AD0 generated by the CBW address generation circuit 51.

When the transaction management circuit 36 makes SIE-WrReq go active, as shown at C6, the buffer management circuit 50 outputs AD0=a0 from the CBW address generation circuit 51 as Address, as shown at C7, and also makes xWR go active (low) as shown at C8. This causes bytes 0 to 3 of CBW (STEWrData) to be written, using a0 of the CBW area 61 of the buffer 60 as the start address, as shown at C9. SIEWrAck subsequently goes active at C10 and an acknowledgment is returned to the transaction management circuit 36.

When the transaction management circuit 36 then makes SIEwrReq go active, as shown at C11, the buffer management circuit 50 outputs AD0=a0+4 as Address to the buffer 60 and also makes xWr go active, as shown at C12 and C13. This causes bytes 4 to 7 of CBW (SIEWrData) to be written, using a0+4 of the CBW area 61 as the start address, as shown at C14. SIEwrAck subsequently goes active at C15 and an acknowledgment is returned to the transaction management circuit 36.

By repeating the above write processing, all of bytes 0 to 30 of CBW (a total of 31 bytes) are written to the CBW area 61.

When an appropriate ACK is returned from the host, as shown at C17 (in FIG. 13), the transaction management circuit 36 makes TranEndPulse go active, as shown at C18, and also sets TranStatus to Success, as shown at C19, to inform the end point management circuit 40 that the transaction was successful.

When that happens, EnCBW of the end point EP1 (the register 43 in FIG. 10) is set to low (0), as shown at C20. This causes the end point management circuit 40 to output EPsel indicating the address AD2 of the EP1 area 63 to the buffer management circuit 50, as shown at C21. As a result, the selector 56 of the buffer management circuit 50 selects the address AD2 of the EP1 area 63 as Address to be output to the buffer 60 during the next data phase (see B3 in FIG. 5A).

With this embodiment configured in this manner, EnCBW of the end point EP1 is set to low (see C20) and the write area for data to be transferred to the end point EP1 from the host is switched from the CBW area 61 (first storage area) to the EP1 area 63 (second storage area) (see C21), on condition that an acknowledge ACK has been returned to the host for data transfer in the command phase (first phase) (see C17). The configuration is such that data from the host is written to the EP1 area 63 after the switch, during the data phase.

In this manner, the use of area switching in accordance with the return or non-return of ACK makes it possible to implement error-free reliable area switching with a low processing load.

2.4.2 Data Length Error or CRC Error

Figure 14:
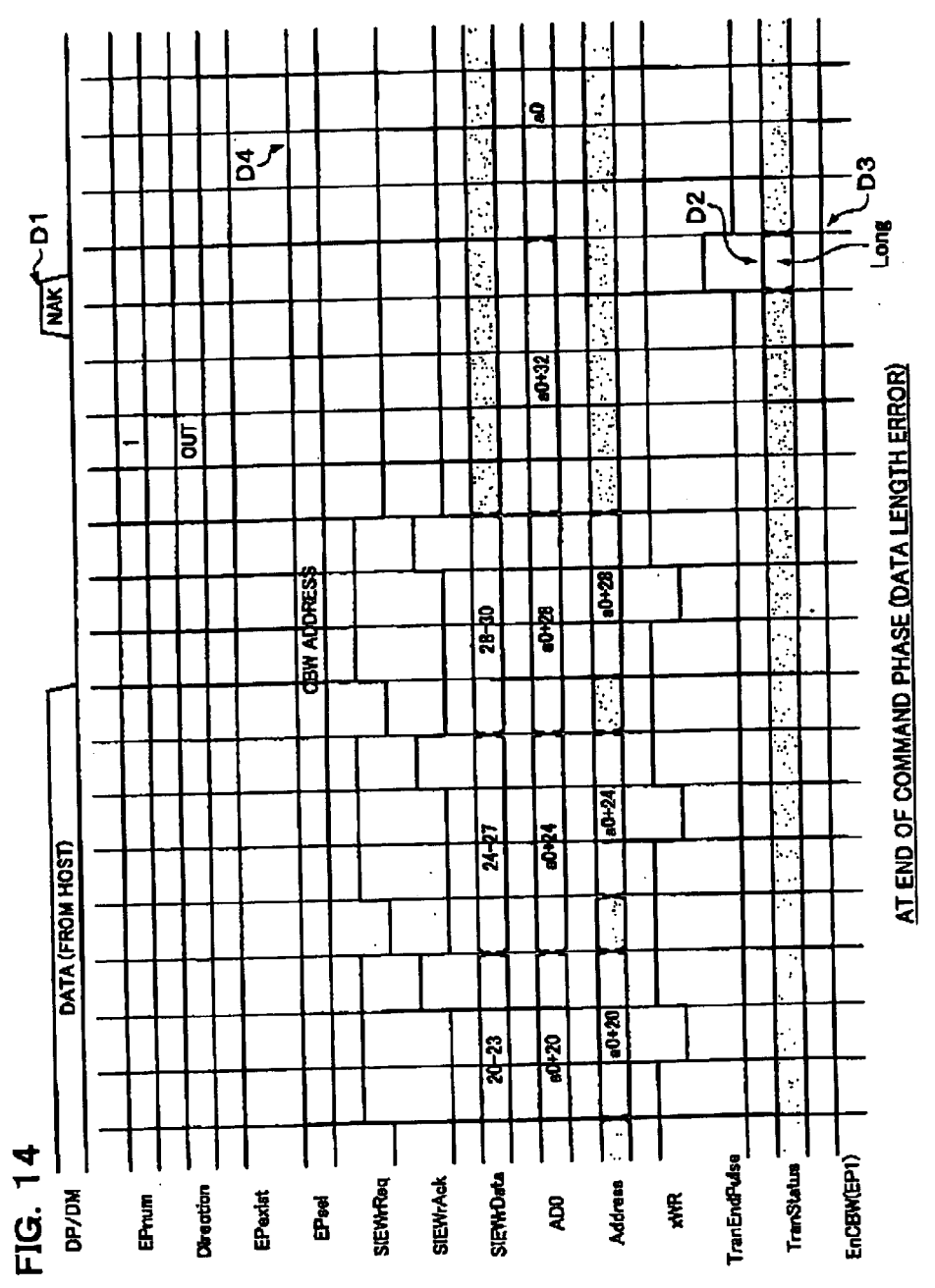

The timing waveform chart of FIG. 14 shows what happens if there is an error in the data length (CBW length) written during the command phase.

If a data length error occurs (the data length is too short or too long), NAK is returned instead of ACK to the host, as shown at D1 in FIG. 14. The transaction management circuit 36 outputs TranStatus to the end point management circuit 40, indicating that there is an error in the data length, as shown at D2. When that happens in this case, EnCBW of the end point EP1 does not go low as it does at C20 in FIG. 13, as shown at D3 in FIG. 14. For that reason, EPsel does not change at D4 and the area is not switched from the CBW area 61 to the EP1 area 63. An error in the data length raises the possibility that there is a phase mismatch between the host and the device, which causes this end point to stall.

Figure 15:
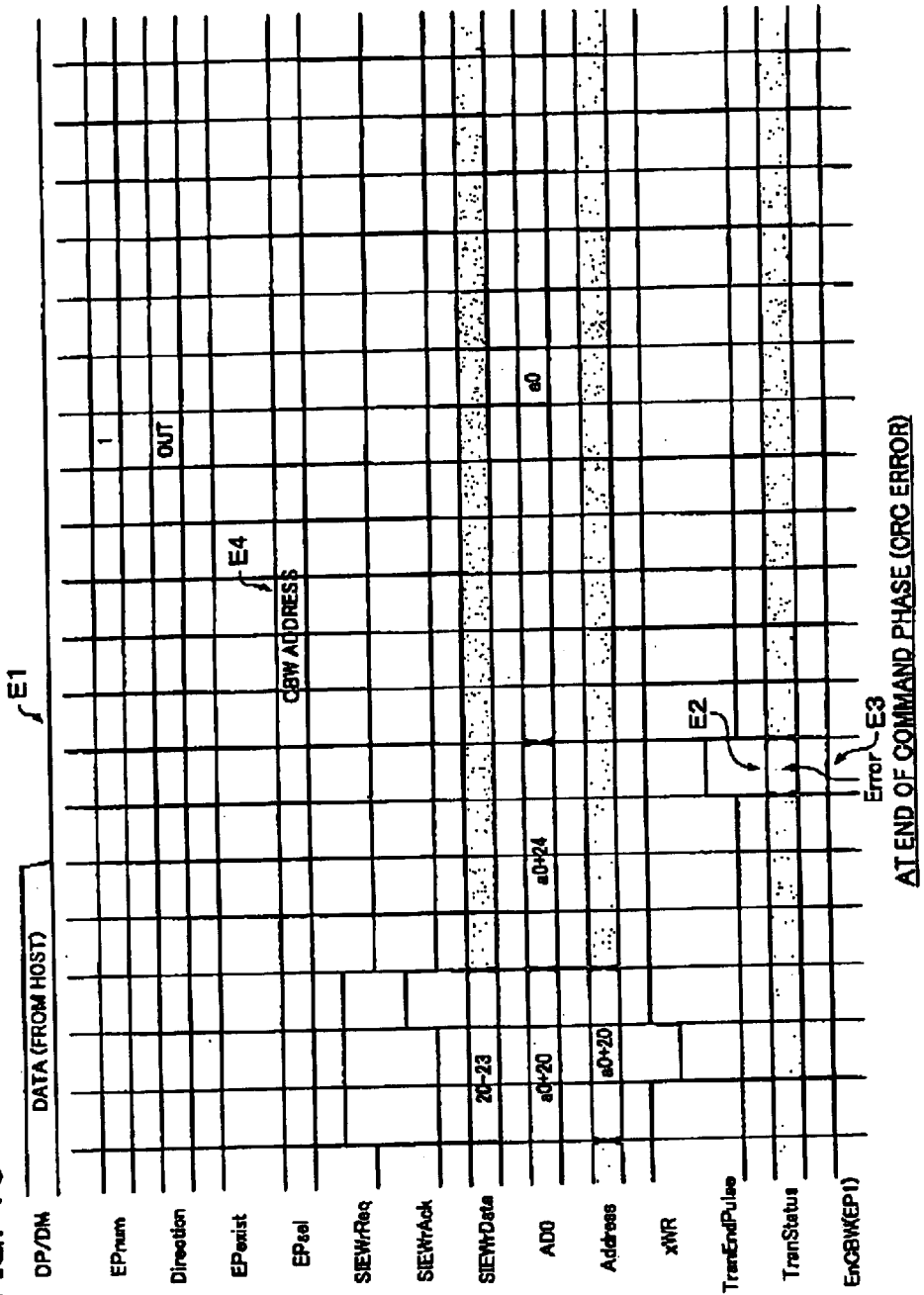
FIG. 15 is a timing waveform chart illustrative of the operation of one embodiment of the present invention when a CRC error occurs.

The timing waveform chart of FIG. 15 shows what happens if a CRC error occurs during the command phase.

If a CRC error has occurred, an ACK is not returned to the host, as shown at E1 in FIG. 15. The transaction management circuit 36 outputs TranStatus, indicating a CRC error, to the end point management circuit 40, as shown at E2. When that happens in this case, EnCBW of the end point EP1 does not go low at E3 of FIG. 15, unlike in the case shown at C20 in FIG. 13. For that reason, EPsel does not change, as shown at E4, and the switch from the CBW area 61 to the EP area 63 does not occur. As a result, the host that has not received ACK executes retry processing, and, if the CBW cannot be re-transferred, the configuration is such that the CBW is written to the CBW area 61 instead of the EP1 area 63. This enables the implementation of appropriate data transfer processing.

2.4.3 Toggle Missing

Figure 16:
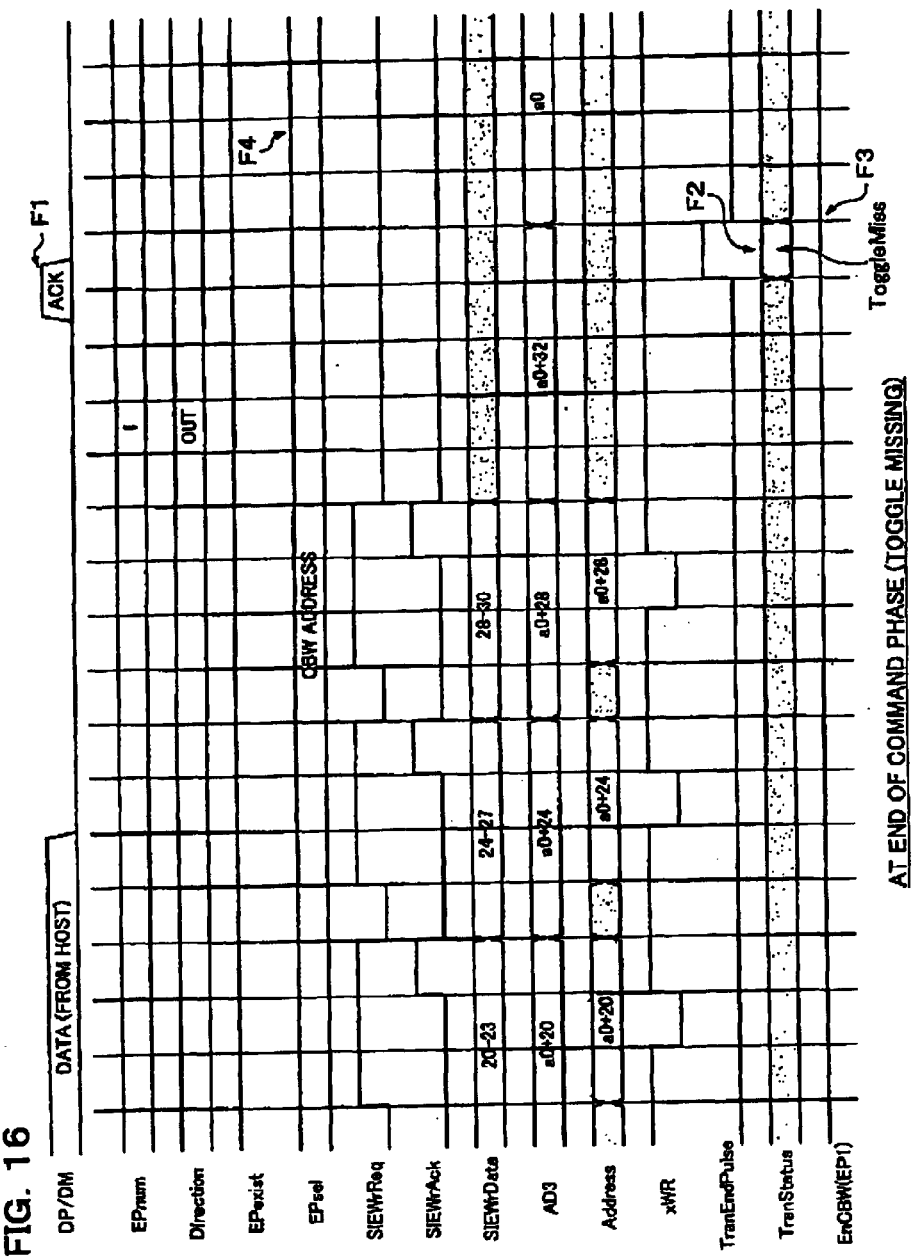
FIG. 16 is a timing waveform chart illustrative of the operation of one embodiment of the present invention when a toggle missing occurs.

The timing waveform chart of FIG. 16 shows what happens if a toggle missing occurs during the command phase.

Figure 17A:
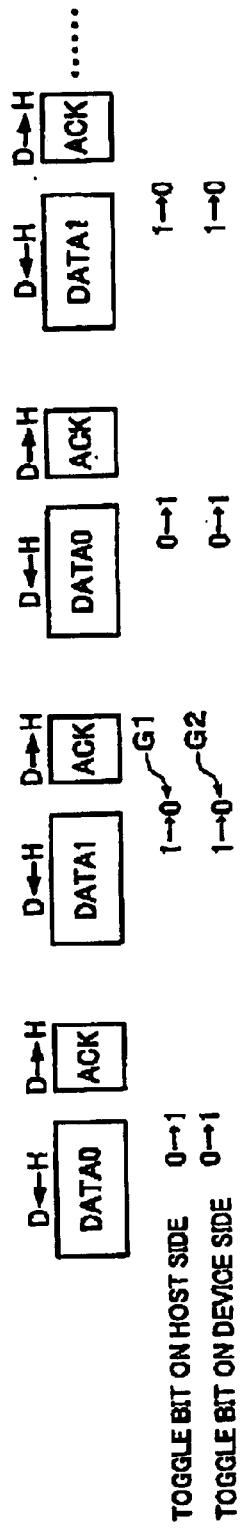
FIGS. 17A and 17B are illustrative of the toggle bit and toggle missing.
Figure 17B:
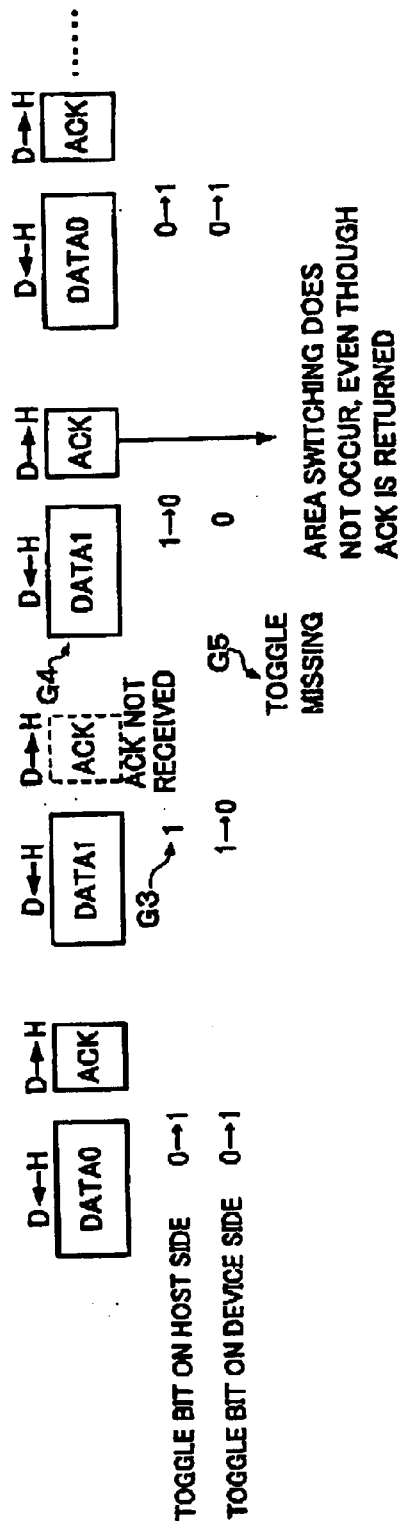

The description first concerns the toggle missing, with reference to FIGS. 17A and 17B.

To ensure synchronization in the transaction sequence between the host and the device under USB, DATA0 and DATA1 are provided as PIDs for the data, and there is also a toggle bit (a bit that ensures synchronization of the transaction sequence between the host and the device), as shown in FIG. 17A.

DATA0 and DATA1 and the toggle bit included within the PID of the data are toggled on condition that the host and the device have determined that the transaction was successful, as shown in FIG. 17A.

For example, if an ACK corresponding to sent data (DATA1) has been returned, the host determines that the transaction was successful and the toggle bit on the host side is toggled, as shown at G1 in FIG. 17A.

If the next incoming data (PID=DATA1) is transferred from the host and ACK is returned to the host, the device determines that the transaction was successful and the toggle bit on the device side is toggled, as shown at G2.

On the other hand, if an ACK corresponding to sent data (PID=DATA1) is not returned as appropriate, the host determines that the transaction was not successful and the toggle bit on the host side is not toggled, as shown at G3 in FIG. 17B. The data with PID=DATA1 is re-sent to the device, as shown at G4.

When that happens, the device, has the data with PID=DATA1 transferred thereto, as shown at G5, although it is waiting for the data with PID=DATA0, so that it determines that a toggle missing has occurred and the toggle bit on the device side is not toggled. In that case, the device cancels the data with PID=DATA1 and returns ACK to the host. This configuration makes it possible to ensure continuity of transactions between the host and the device.

If such a toggle missing happens with this embodiment, the configuration is such that the area switching from the CBW area 61 to the EP1 area 63 does not occur, even if the acknowledge ACK is returned to the host.

In other words, ACK is returned to the host if a toggle missing occurs, as shown at F1 in FIG. 16. The transaction management circuit 36 outputs TranStatus, indicating a toggle missing, to the end point management circuit 40, as shown at F2. When that happens in this case, EnCBW of the end point EP1 does not go low at F3 in FIG. 16. For that reason, EPsel does not change at F4, and the area is not switched from the CBW area 61 to the EP1 area 63. This enables the implementation of appropriate data transfer processing even if a toggle missing occurs.

2.5 Comparison of Comparative Example and this Embodiment

An example of a timing waveform chart of a comparative example (see FIGS. 6A to 6D) is shown in FIG. 18A and an example of a timing waveform chart of this embodiment is shown in FIG. 18B. FIGS. 18A and 18B are timing waveform charts that illustrate the case when the buffer storage area has a double-buffer structure.

In the comparative example of FIG. 18A, for example, the CBW from the host is written to the FIFO (600 in FIG. 6A) for EP1 in the command phase, as shown at H1. If the FIFO double-buffer structure in this case, one OUT data from the host may be written to the FIFO, as shown at H2. However, since the next OUT data cannot be written to the FIFO, NYET is returned in answer to the next OUT data request from the host, as shown at H3.

The device returns NAK as shown at H5, even in answer to a PING packet from the host asking whether the FIFO has become empty. In other words, the device continues to return NAK to the host up until the end of CPU command interpretation. When command interpretation ends and the FIFO becomes empty, it becomes possible for OUT data from the host to be accepted and written to the FIFO, as shown at H6.

In contrast thereto, it the CBW is written to the CBW area of this embodiment, as shown at H7 in FIG. 18B, and a suitable ACK is returned. EnCBW goes low, as shown at H8 (see C20 in FIG. 13). When that happens, the area is switched from the CBW area to the EP1 area, as described with reference to FIG. 7B, and the end point EP1 is connected to the EP1 area.

It is therefore possible to ensure that OUT data is written from the host to this EP1 area in the data phase and ACK is returned to the host, as shown at H9. When command interpretation ends at H10, the configuration is such that DMA transfer with respect to a hard disk drive or the like may begin, using the EP1 area, as shown at H11, enabling efficient transfer of data from USB.

The DMA transfer of data with this embodiment may begin earlier than with the comparative example, making it possible to keep the loss of the bus zone to a minimum and thus enabling an increase in the effective data transfer speed in comparison with the comparative example.

A flowchart of the processing of the firmware (CPU) of the comparative example is shown in FIG. 19A and a flowchart of the processing of the firmware in accordance with this embodiment is shown in FIG. 19B.

In the comparative example of FIG. 19A, the firmware first determines whether or not the OUT transaction has been completed (step S1). In other words, it waits for the return of ACK from the device, as shown at H1 in FIG. 18A.

When it has determined that the OUT transaction has been completed, the firmware then reads the CBW out from the EP1 FIFO (step S2). It then determines whether or not the data length has reached 31 bytes (whether or not the data length is suitable) (step S3) and, if it has reached 31 bytes, it moves on to command processing (step S5). If it has not reached 31 bytes, on the other hand, the firmware moves on to error processing (step S6).

With this embodiment, shown in FIG. 19B, the firmware first determines whether or not the CBW transaction shown at H7 in FIG. 18B (the write to the CBW area) has been completed appropriately (step S11). If the CBW transaction has not been completed, the firmware determines whether or not a CBW error has occurred (step S12), and, if a CBW error has occurred, it moves on to error processing (step S16). If a CBW error has not occurred, on the other hand, the firmware returns to step S11 to wait for the completion of the CBW transaction.

If the data length error of FIG. 14 has occurred, for example, a CBW error is determined and the firmware moves on to the error processing of step S16. If the toggle missing of FIG. 16 has occurred, on the other hand, the firmware returns from step 12 to step 11 without determining that a CBW error has occurred.

If the data transfer of FIG. 13 has been successful, on the other hand, it is determined that the CBW transaction has been completed and EnCBW goes low. The firmware then reads the CBW from the CBW area (step S13), interprets the command (step S14), and moves on to command processing (step S15). Since the CBW area has been set to be randomly accessible in this case, as described with reference to FIGS. 8A and 8B, it is possible to end command interpretation earlier than with the comparative example, enabling an earlier transition to DMA transfer.

3. Electronic Equipment

The description now turns to examples of electronic equipment including the data transfer control device of this embodiment of the invention.

Figure 20A:
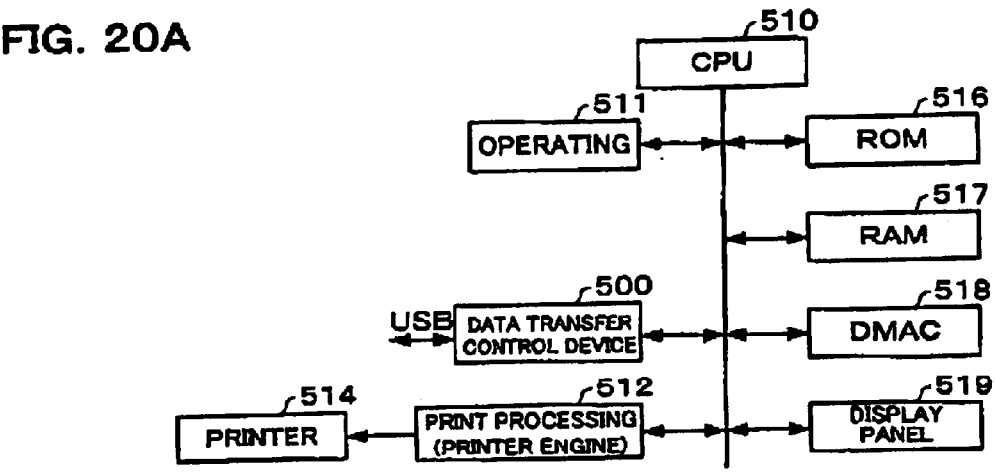
FIGS. 20A, 20B, and 20C are internal block diagrams of various items of electronic equipment.
Figure 21A:
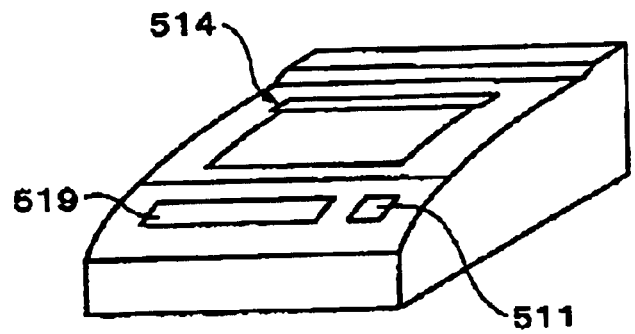
FIGS. 21A, 21B, and 21C show typical external views of various items of electronic equipment.

An internal block diagram of a printer that is one example of such electronic equipment is shown in FIG. 20A with an external view thereof being shown in FIG. 21A. A CPU (microcomputer) 510 has various functions, including that of controlling the entire system. An operating section 511 is designed to enable the user to operate the printer. Data such as a control program and fonts is stored in a ROM 516, and a RAM 517 functions as a work area for the CPU 510. A DMAC 518 is a DMA controller for transferring data through the CPU 510. A display panel 519 is designed to inform the user of the operational state of the printer.

Serial print data that has been send in from another device such as a personal computer via USB is converted into parallel print data by a data transfer control device 500. The thus converted parallel print data is sent to a print processing section (a printer engine) 512 by the CPU 510 or the DMAC 518. This parallel print data is subjected to given processing in the print processing section 512 and is output for printing to paper by a print section (a device for outputting data) 514 including components such as a print head.

Figure 20B:
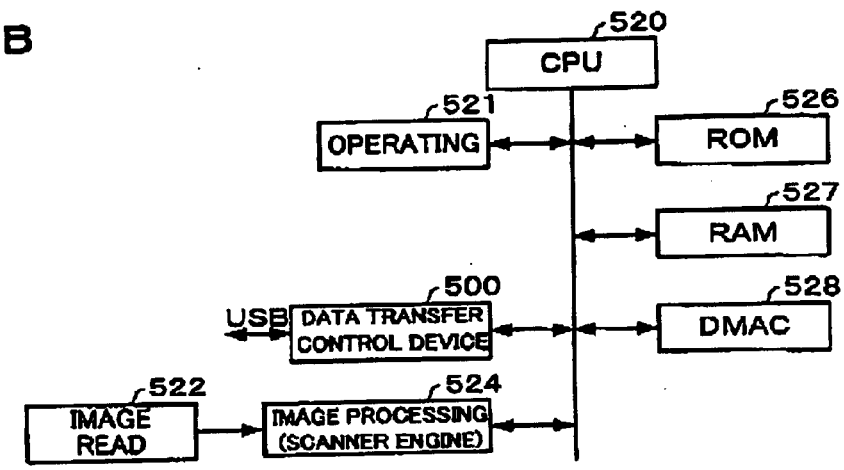
Figure 21B:
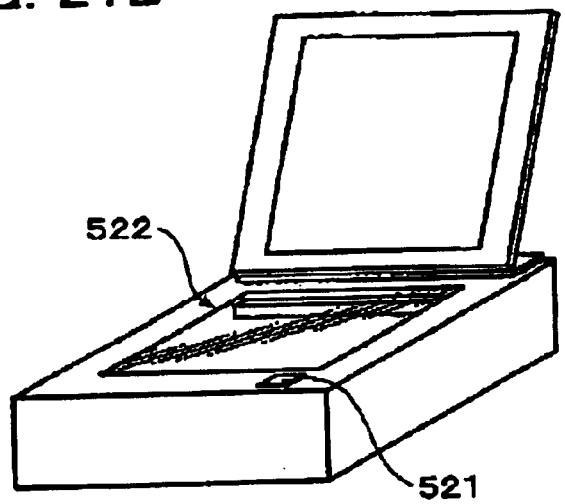

An internal block diagram of a scanner that is another example of electronic equipment is shown in FIG. 20B with an external view thereof being shown in FIG. 21B. A CPU 520 has various functions, including that of controlling the entire system. An operating section 521 is designed to enable the user to operate the scanner. Data such as a control program is stored in a ROM 526, and a RAM 527 functions as a work area for the CPU 520. A DMAC 528 is a DMA controller.

An image of a document is read in by an image read section (a device for fetching data) 522, which includes components such as a light source and an opto-electric converter, and data of the read-in image is processed by an image processing section (a scanner engine) 524. The processed image data is sent to the data transfer control device 500 by the CPU 520 or DMAC 528. The data transfer control device 500 converts that parallel image data into serial data and sends it to another device such as a personal computer via USB.

Figure 20C:
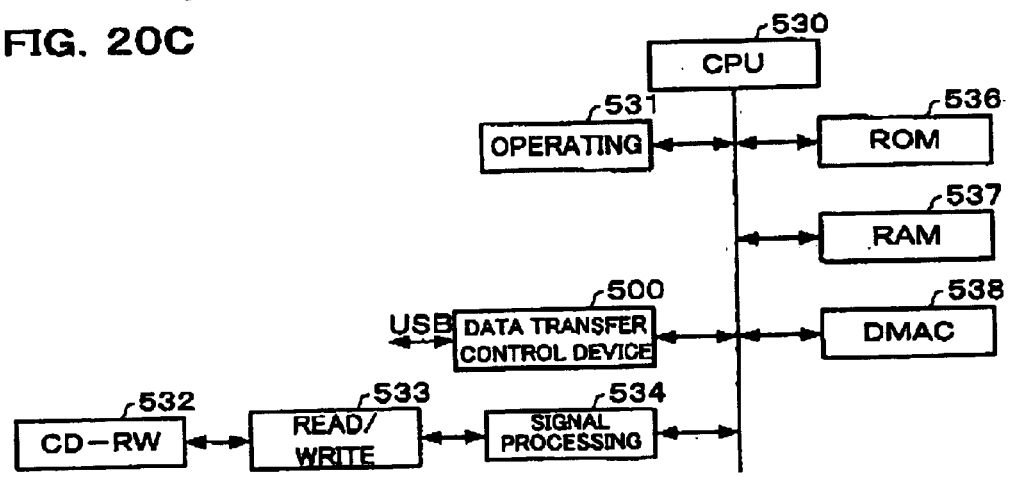
Figure 21C:
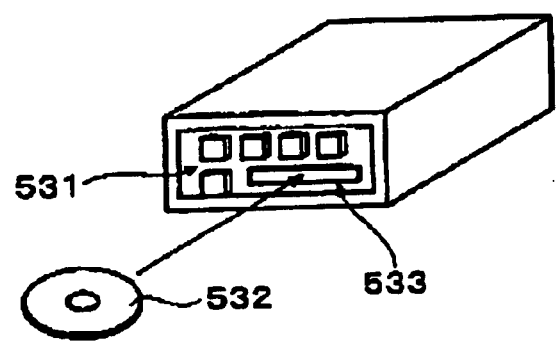

An internal block diagram of a CD-RW drive that is a further example of electronic equipment is shown in FIG. 20C with an external view thereof being shown in FIG. 21C. A CPU 530 has various functions, including that of controlling the entire system. An operating section 531 is designed to enable the user to operate the CD-RW drive. Data such as a control program is stored in a ROM 536, and a RAM 537 functions as a work area for the CPU 530. A DMAC 538 is a DMA controller.

Data read out from a CD-RW 532 by a read/write section (a device for fetching data or a device for storing data) 533, which including components such as a laser, a motor, and an optical system, is input to a signal processing section 534 where it is subjected to given signal processing such as error correction. The data that has been subjected to this signal processing is sent to the data transfer control device 500 by the CPU 530 or the DMAC 538. The data transfer control device 500 converts this parallel data into serial data, then sends it to another device such as a personal computer via USB.

Serial data that comes in from another device via USB, on the other hand, is converted into parallel data by the data transfer control device 500. This parallel data is sent to the signal processing section 534 by the CPU 530 or the DMAC 538. This parallel print data is subjected to given signal processing by the signal processing section 534 then is stored by the read/write section 533 on the CD-RW 532.

Note that a separate CPU for controlling data transfer by the data transfer control device 500 could be provided in addition to the CPU 510, 520, or 530 of FIG. 20A, FIG. 20B, FIG. 20C.

Use of the data transfer control device of this embodiment of the present invention in electronic equipment makes it possible to transfer data in the HS mode laid down by USB 2.0. When a user uses a personal computer or the like to specify a printout, it is therefore possible to complete printing with only a small time lag. Similarly, the user can view an image that is read in with only a small time lag after a scanner has been instructed to fetch the image. It also makes it possible to read data from a CD-RW and write data to a CD-RW at high speed.

Use of the data transfer control device of this embodiment in electronic equipment makes it possible to manufacture a data transfer control device that enables data transfer in HS mode, even with ordinary semiconductor processing with inexpensive fabrication costs. It is therefore possible to reduce the cost of the data transfer control device and thus reduce the cost of the electronic equipment. In addition, it is possible to increase the reliability of data transfer, thus increasing the reliability of the electronic equipment.

Use of the data transfer control device of this embodiment in electronic equipment reduces the processing load on the firmware operating on the CPU, thus making it possible to use an inexpensive CPU. Furthermore, since it is possible to reduce the cost and the scale of the data transfer control device, it is possible to aim for a reduction in the cost and scale of the electronic equipment.

Note that the electronic equipment that can employ a data transfer control device in accordance with the present invention is not limited to the above described embodiment, and thus various other examples may be considered, such as various types of optical disk drive (CD-ROM or DVD), magneto-optical (MO) disk drives, hard disk drives, TVs, VCRs, video cameras, audio equipment, telephones, projectors, personal computers, electronic organizers, and dedicated wordprocessors.

Note also that the present invention is not limited to the embodiment described herein, and various modifications are possible within the scope of the invention as laid out hereunder.

For example, the configuration of the data transfer control device in accordance with the present invention is not limited to that shown in FIGS. 9, 10, and 11, and thus various modifications thereof are possible.

In addition, this embodiment has been described with reference to a case in which the first storage area is a CBW area (command storage area) and the second storage area is an EP1 area (data storage area), but the present invention is not limited thereto. In other words, the information stored in the first and second storage areas may be of any type. Furthermore, three or more information could be set to the end points, and the types of informations may be freely selected.

This embodiment has been described with reference to an example in which the present invention was applied to the USB Bulk-Only specification, but the application of the present invention is not limited to the USB Bulk-Only specification.

In addition, the method of switching between the first and second storage areas is not limited to the method described in detail with reference to FIGS. 7A to 19B, and thus various modifications thereof are possible.

Furthermore, it is particularly desirable to apply the present invention to data transfer under USB 2.0, but the present invention is not limited thereto. For example, the present invention can also be applied to data transfer in accordance with a standard that is based on a concept similar to that of USB 2.0, or a standard that is developed from USB 2.0.

What is claimed is:

1. A data transfer control device for data transfer through a bus, the data transfer control device comprising:
   an end point management circuit that manages a first to n-th end point, where n is a natural number greater than or equal to 2, the end point management circuit receiving an end point number specification signal and outputting an end point selection signal;
   a buffer that includes a first storage area for a first information and a second storage area for a second information, the first and second storage areas being provided for the first end point, when a plurality of types of informations including the first and second informations have been allocated as informations to be transferred through the first end point; and
   a buffer management circuit that writes information transferred from a host to an end point into the first storage area for the first information during a first phase in which the first information is transferred through the bus, and writes information transferred from the host to the end point into the second storage area for the second information during a second phase in which the second information is transferred through the bus,
   the first storage area for the first information being set to be a randomly accessible area,
   the second storage area for the second information being set to be an area such that information that is input first thereto is output first therefrom, and
   the first information controlling the transfer of the second information, and the second information from a first bus being transferred to a second bus through the data transfer control device,
   wherein when the received end point number specification signal specification signal specifies the first end point, the end point management circuit outputs the end point selection signal to select the first information area during the first phase and outputs the end point selection signal to select the second information area during the second phase.

2. The data transfer control device as defined by claim 1, at least one of a command block indicating the transfer of the second information and length information of the second information, the transfer thereof being indicated by a command block, being written into an area other than a start address of the first storage area for the first information.

3. Electronic equipment comprising:
   the data transfer control device as defined by claim 2; and
   a device which performs output processing, fetch processing, or storage processing on data transferred through the data transfer control device and the bus.

4. The data transfer control device as defined by claim 1, a write area for information transferred from the host to the end point being switched from the first storage area to the second storage area, on condition that an acknowledgment concerning data transfer in the first phase has been returned to the host.

5. The data transfer control device as defined by claim 4, switching from the first storage area to the second storage area is not performed on condition that an error occurs in a data toggle bit for synchronizing a transaction sequence with the host, even when an acknowledgment has been returned to the host.

6. Electronic equipment comprising:
   the data transfer control device as defined by claim 4; and
   a device which performs output processing, fetch processing, or storage processing on data transferred through the data transfer control device and the bus.

7. The data transfer control device as defined by claim 1, a data packet being written to the second storage area while a processing unit interprets the command block packet.

8. Electronic equipment comprising:
   the data transfer control device as defined by claim 7; and
   a device which performs output processing, fetch processing, or storage processing on data transferred through the data transfer control device and the bus.

9. The data transfer control device as defined by claim 1, data transfer being in accordance with the universal serial bus (USB) standard.

10. Electronic equipment comprising:
    the data transfer control device as defined by claim 9; and
    a device which performs output processing, fetch processing, or storage processing on data transferred through the data transfer control device and the bus.

11. Electronic equipment comprising:
    the data transfer control device as defined by claim 1; and
    a device which performs output processing, fetch processing, or storage processing on data transferred through the data transfer control device and the bus.

12. The data transfer control device as defined by claim 1, the first information being interpreted by a processor during the first and/or second phase.

13. A data transfer control device for data transfer through a bus, the data transfer control device comprising:

an end point management circuit that manages a first to n-th end point, where n is a natural number greater than or equal to 2, the end point management circuit receiving an end point number specification signal and outputting an end point selection signal;

a buffer that includes a command storage area for a command block and a data storage area for data, the command storage area and the data storage area being provided for one end point, when a command block packet and a data packet have been allocated as informations to be transferred through the one end point; and a buffer management circuit that switches an information write area from the command storage area for a command block to the data storage area for data and writes a data packet transferred from the host to the end point into the data storage area, when a phase switches from a command phase in which a command block packet is transferred through the bus to a data phase in which a data packet is transferred through the bus; and a processor that reads command block information during the command phase and/or the data phase, wherein when the received end point number specification signal specifies the first end point, the end point management circuit outputs the end point selection signal to select the command storage area during the command phase and outputs the end point selection signal to select the data storage area during the data phase.

14. The data transfer control device as defined by claim 13, data transfer being in accordance with the universal serial bus (USB) standard.

15. Electronic equipment comprising:

the data transfer control device as defined by claim 14; and a device which performs output processing, fetch processing, or storage processing on data transferred through the data transfer control device and the bus.

16. Electronic equipment comprising:

the data transfer control device as defined by claim 13; and a device which performs output processing, fetch processing, or storage processing on data transferred through the data transfer control device and the bus.

17. A data transfer control method for data transfer through a bus, comprising managing a first to n-th end point, where n is a natural number greater than or equal to 2, the managing step including receiving an end point number specification signal and outputting an end point selection signal;

providing a first storage area for a first information and a second storage area for a second information for the first end point on a buffer, when a plurality of types of informations including the first and second informations have been allocated as informations to be transferred through the first end point; and writing information transferred from a host to an end point to the first storage area for the first information during a first phase in which the first information is transferred through the bus, and writing information transferred from the host to the end point to the second storage area for the second information during a second phase in which the second information is transferred through the bus, the first storage area for the first information being set to be a randomly accessible area, the second storage area for the second information being set to be an area such that information that is input first thereto is output first therefrom, and the first information controlling the transfer of the second bus through the data transfer control device, wherein when the received end point number specification signal specifies the first end point, the step of managing the end point includes outputting the end point selection signal to select the first information area during the first phase and outputting the end point selection signal to select the second information area during the second phase.

18. The data transfer control method as defined by claim 17, the first information being interpreted by a processor during the first and/or second phase.

19. A data transfer control method for data transfer through a bus, comprising:

managing a first to n-th end point, where n is a natural number greater than or equal to 2, managing step including receiving an end point number specification signal and outputting an end point selection signal;

providing a command storage area for a command block and a data storage area for data for one end point on a buffer, when a command block packet and a data packet have been allocated as informations to be transferred through the one end point;

switching an information write area from the command storage area for a command block to a data storage area for data, and writing a data packet transferred from the host to the end point into the data storage area, when a phase switches from a command phase in which a command block packet is transferred through the bus to a data phase in which a data packet is transferred through the bus; and reading command information during the command phase and/or the data phase, wherein when the received end point number specification signal specifies the first end point, the step of managing the end point includes outputting the end point selection signal to select the command storage area during the command phase and outputting the end point selection signal to select the data storage area during the data phase.

* * * * *